(12) United States Patent
Alhebshi

(10) Patent No.: US 8,865,108 B2
(45) Date of Patent: Oct. 21, 2014

(54) PROCESS FOR MAKING MULTI-WALLED CARBON NANOTUBES AND MULTI-WALLED CARBON NANOTUBES FORMED THEREFROM

(76) Inventor: Hashem M. A. Alhebshi, Melrose, MA (US)

( * ) Notice: Subject to any disclaimer, the term of this patent is extended or adjusted under 35 U.S.C. 154(b) by 97 days.

(21) Appl. No.: 13/529,078

(22) Filed: Jun. 21, 2012

(65) Prior Publication Data

US 2013/0343982 A1    Dec. 26, 2013

(51) Int. Cl.
*C01B 31/00*    (2006.01)

(52) U.S. Cl.
USPC ............... 423/447.3; 423/447.1; 977/753

(58) Field of Classification Search
USPC .......... 423/447.1, 447.2, 447.3; 977/753
See application file for complete search history.

(56) References Cited

U.S. PATENT DOCUMENTS

| | | | |
|---|---|---|---|
| 6,764,874 B1 * | 7/2004 | Zhang et al. | 438/99 |
| 2006/0013757 A1 * | 1/2006 | Edwin et al. | 423/447.3 |
| 2013/0078374 A1 * | 3/2013 | Salah | 427/215 |

FOREIGN PATENT DOCUMENTS

| | | |
|---|---|---|
| JP | 2002-210434 | 7/2002 |
| JP | 2009-73706 | 4/2009 |

OTHER PUBLICATIONS

Sangchul Nam, Wan Namkoong, Irradiation effect on leaching behavior and form of heavy metals in fly ash of municipal solid waste incinerator, Journal of Hazardous Materials, vols. 199-200, Jan. 15, 2012, pp. 440-447, ISSN 0304-3894, http://dx.doi.org/10.1016/j.jhazmat.2011.11.049.*

Synthesis of Multiwalled Carbon Nanotubes on Fly Ash Derived Catalysts Oscar M. Dunens, Kieran J. MacKenzie, and Andrew T. Harris Environmental Science & Technology 2009 43 (20), 7889-7894.*

A. Yasui, et al. "Synthesis of Carbon Nanotubes on Fly Ashes by Chemical Vapor Deposition Processing." IEEJ Trans. Elec. Electron Eng., 4: pp. 787-789, (2009).

Dunens, OM., et al. "Synthesis of multiwalled carbon nanotubes on fly ash derived catalysts." Environ. Sci. Technol., vol. 4, No. 20, pp. 7889-7894. Oct. 15, 2009.

Nam, S., et al. "Irradiation effect on leaching behavior and form of heavy metals in fly ash of municipal solid waste incinerator," J Hazard Mater., pp. 199-200; 440-7. Jan. 15, 2012.

* cited by examiner

*Primary Examiner* — Richard M Rump
(74) *Attorney, Agent, or Firm* — Oblon, Spivak, McClelland, Maier & Neustadt, L.L.P.

(57) ABSTRACT

A process for making multi-walled carbon nanotubes includes contacting a hydrocarbon-containing gas with an electron beam-treated fly ash catalyst. The electron beam-treated fly ash catalyst contains a total amount of iron oxide and vanadium oxide of up to 5 wt. %. The multi-walled carbon nanotubes may be formed in a low pressure chemical vapor deposition apparatus.

6 Claims, 38 Drawing Sheets

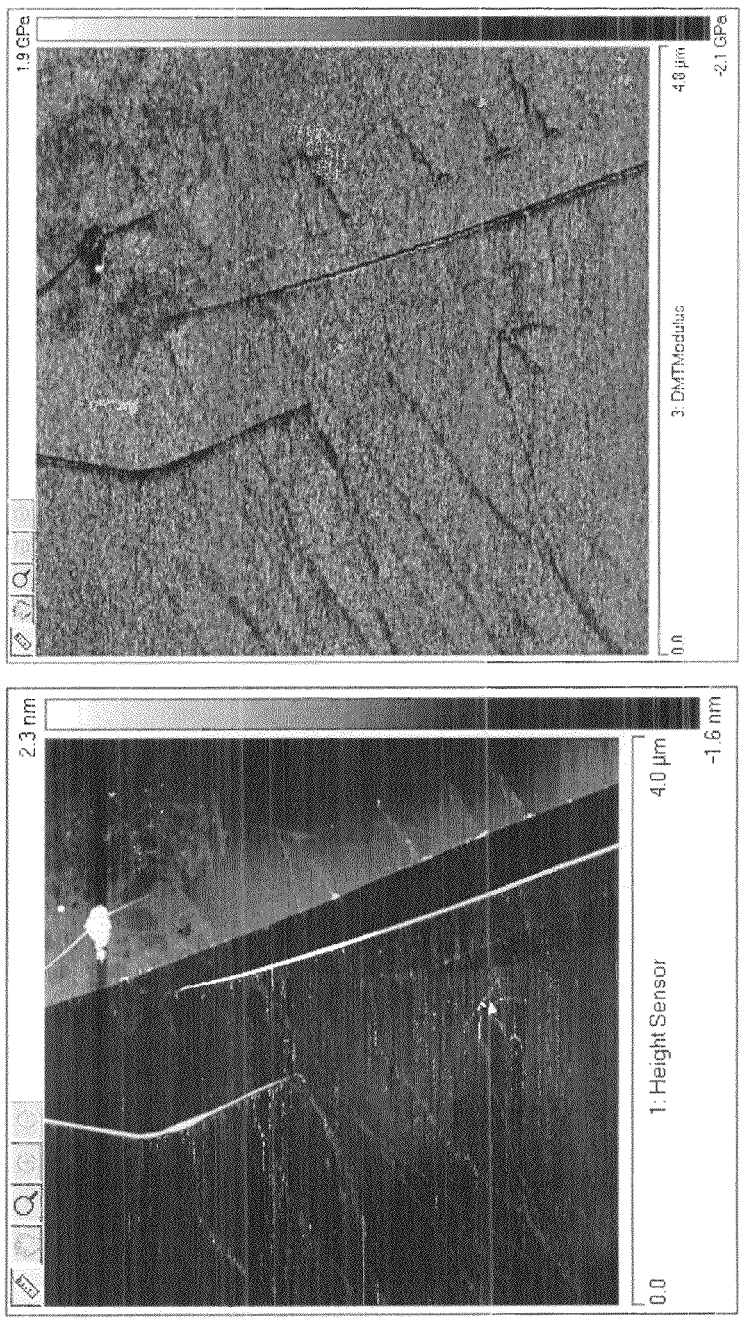

PROCESS FOR MAKING MULTI-WALLED CARBON NANOTUBES AND MULTI-WALLED CARBON NANOTUBES FORMED THEREFROM

GRANT OF NON-EXCLUSIVE RIGHT

This application was prepared with financial support from the Saudi Arabian Cultural Mission, and in consideration therefore the present inventor(s) has granted The Kingdom of Saudi Arabia a non-exclusive right to practice the present invention.

BACKGROUND OF THE INVENTION

1. Field of the Invention

The invention relates to a process for making multi-walled carbon nanotubes from a fly ash obtained from the combustion of a hydrocarbon mineral. The invention includes a low pressure chemical vapor deposition process in which an acetylene and carbon monoxide mixture is contacted with an electron beam treated crude oil fly ash. The invention further relates to a multi-walled carbon nanotube obtained from a process that utilizes ash obtained from the combustion of a hydrocarbon mineral.

2. Description of the Related Art

The description of the related art provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Carbon exists in several forms or allotropes of particular chemical structure. Fullerenes are one form of carbon and encompass structures such as spherical structure also know as buckminster fullerenes and tubular structures also known as nanotubes. Graphene is also a sheet form carbon, however existing only in a two-dimensional form absent the three-dimensional structure that accompanies carbon sheets which are rolled or interconnected to thereby form a three-dimensional structure. Fullerenes generally have a structure formed from as two-dimensional grapheme sheet which, when rolled end-to-end, exists in the form of a tube or other three dimensional structure. The outer shell portion of a tubular structure having dimensions on a nanometer scale, known as a nanotube, encompasses an inner hollow portion in which other molecules or elements may be present.

Carbon nanotubes can further be described as having single-walled or multi-walled structures. Single-walled nanotubes are generally tightly wrapped layers of graphene forming tubes with a diameter of as little as one nanometer with an essentially unlimited length. Multi-walled nanotubes, on the other hand, contain multiple layers of roiled graphene sheets such that a first inner tube may be wrapped with a plurality of additional grapheme sheets to provide a layered structure wherein a plurality of tubes are nested in one another. Alternately a multi-walled nanotube may have a structure in which a graphene sheet is rolled upon itself such that the same grapheme sheet forms multiple layers of the nanotube.

Carbon nanotubes have physical and chemical properties that are of great interest in many fields of technology. Physical properties such as strength and stiffness are of special interest in applications such as fillers for plastic materials. Nanotubes may find use as coatings in special applications that are resistant to penetration, thermal stress, chemical stress and/or friction.

The tubular structure of a nanotube offers the possibility of forming nano-channels which may be used to purify chemicals and/or structure to provide specific electronic properties. A nanotube wire in which one or more molecules or atoms is permitted to move in two directions can be envisaged as offering unique electronic properties and applications such as microelectronics.

Although carbon nanotubes may exist naturally and may be formed during processes in which naturally occurring hydrocarbon materials are combusted or present in a highly reducing environment, it is generally thought that naturally occurring carbon nanotubes are of insufficient purity and regularity to have any significant commercial or technological use. Several methods have been developed for synthesizing carbon nanotubes on both small and large scale. Arc discharge was used early in the development phase of carbon allotropes. Using high voltage and high current electrical discharge in which at least one electrode of an arc is made from carbon forms carbon material in the form of nanotubes.

Laser ablation has also been to form carbon nanotubes. Elemental carbon is vaporized using a high energy laser in the presence of a cooling gas. As the vaporized carbon condenses in the cooling gas carbon nanotubes are formed and are collected by precipitation. By careful selection of conditions of temperature and laser energy, particular forms of carbon nanotubes can be isolated. Laser ablation offers substantially improved yields in comparison to arc discharge, however, laser ablation must be operated under conditions which are substantially more expensive and, in certain circumstances, less selective than the arc discharge method of making carbon nanotubes.

Chemical vapor deposition (CVD) has been used to make both single-walled and multi-walled carbon nanotubes. This method utilizes a hydrocarbon gas mixture that is contacted with a metal-containing catalyst. Under the correct conditions the hydrocarbon-containing gas decomposes and/or changes chemical formula when in contact with a heterogeneous catalyst such that carbon nanotubes are precipitated and/or formed on the catalyst particle. Conventional CVD techniques are amenable to forming carbon nanotubes of desirable structure and purity. Nonetheless CVD techniques have, so far, been difficult to scale to commercial quantities due to costs and throughput limitations.

The use of fly ash as a catalyst material for generating multi-walled carbon nanotubes has been described (see Dunens et al., Environ. Sci. Technol., 2009, 43 (20), pp. 7889-7894—incorporated herein by reference in its entirety). The use of particularly treated and/or chemically modified fly ash materials or fly ash materials obtained from the combustion of crude oil was not described. Likewise Yasui et al. (IEEJ Trans. Elec. Electron Eng., 2009, 4 (6) pp. 787-789) describe the use of a fly ash obtained from the combustion of coal. The authors did not describe the preparation of multi-walled carbon nanotubes from crude oil fly ash or the pre-treatment of a fly ash with electron beam bombardment. Irradiation effects on the leaching behavior and form of heavy metals in fly ash of municipal solid waste incinerator was described by Nam et al. (Journal of Hazardous Materials, Volumes 199-200, 15 Jan. 2012, pages 440-447).

The inventors have discovered that CVD processes can be used to form multi-walled carbon nanotubes in high yield and at low costs using carbon-containing fly ash obtained from the combustion of crude oil. The method described herein provides a low cost method for the industrial-scale production of multi-walled carbon nanotubes which utilizes materials as catalysts which would ordinarily be considered low value waste. The characteristics of multiwall carbon nanotubes have been reviewed by Lehman et al. (Carbon, Volume 49, Issue 8, Jul. 2011, pages 2581-2602).

In Saudi Arabia in particular the use of crude oil as a fuel source is widespread. The power plants in Saudi Arabia consumed 22 million metric tons of various types of fuel and fuel oil, especially heavy and thus large amounts of carbon-containing fly ash material is formed as a by-product from energy generation. Finding a use for the fly ash by-product provides many advantages that are limited only to getting rid of damage to the environment, but also for the use of the fly ash materials in the pipeline industry, e.g., for the formation of carbon nano-metric materials which have significant economic value.

SUMMARY

The foregoing paragraphs have been provided by way of general introduction, and are not intended to limit the scope of the following claims. The described embodiments, together with further advantages, will be best understood by referenced and following detailed description taken in conjunction with the accompanying drawings.

It is an object of the invention to provide a process for making carbon nanotubes.

It is a further object of the invention to provide a process for forming multi-walled carbon nanotubes.

It is a further object of the invention to provide a method for forming multi-walled carbon nanotubes by chemical vapor deposition.

It is a further object of the invention to provide a process for forming multi-walled carbon nanotubes by contacting a hydrocarbon-containing gas with a catalyst containing both carbon and one or more metals.

It is a further object of the invention to provide a process for forming multi-walled carbon nanotubes by contacting a hydrocarbon-containing gas with a catalyst comprising ash obtained from the combustion of a hydrocarbon.

It is a further object of the invention to provide a process for forming multi-walled carbon nanotubes by contacting a hydrocarbon-containing gas with a catalyst containing ash obtained from the combustion of a hydrocarbon mineral.

It is a further object of the invention to provide a process for forming multi-walled carbon nanotubes by contacting a hydrocarbon-containing gas with fly ash obtained by combustion of crude oil.

It is a further object of the invention to provide multi-walled carbon nanotubes.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3($b$) shows an electron micrograph of a multi-walled carbon nanotube formed by a process of the invention;

FIG. 6 shows the surface of a MWCNT probed with an atomic force microscope;

DETAILED DESCRIPTION OF THE EMBODIMENTS

Figure 1:
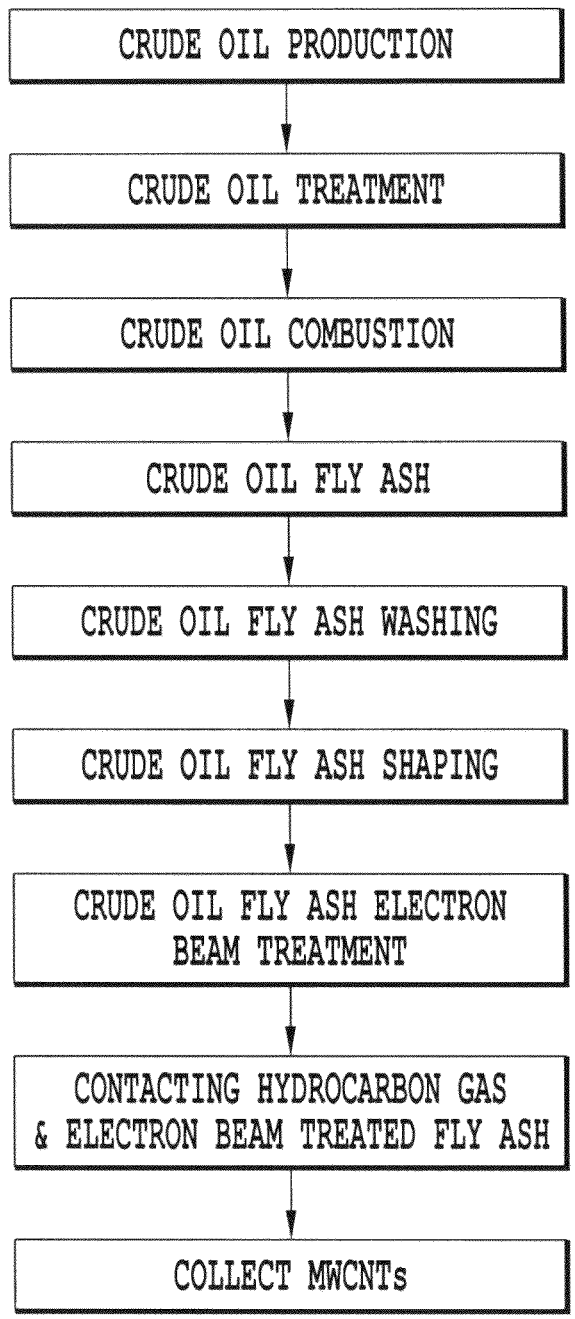
FIG. 1 shows a process flow diagram describing an embodiment of the invention.

Referring now to the drawings, wherein like reference numerals designate identical or corresponding parts throughout the several views.

One aspect of the invention includes a process for forming multi-walled carbon nanotubes in a chemical vapor deposition apparatus that contains a catalyst comprising particles of crude oil fly ash. Contacting a hydrocarbon-containing gas with the fly ash-containing catalyst results in the formation of multi-walled carbon nanotubes at high yield under conditions which are economically favorable for large scale production. A high level overview of a series of steps which includes one or more steps of the process of the invention is described in the flow chart FIG. 1.

It is preferable that the multi-walled carbon nanotubes are formed by contacting hydrocarbon-containing gas with a catalyst that comprises crude oil fly ash. The catalyst may consist of the crude oil fly ash or alternately consist essentially of crude oil fly ash such that components which would negate the purity or speed of formation of multi-walled carbon nanotubes are excluded. In still another embodiment of the invention the catalyst comprises particles of crude oil fly ash present as a mixture with one or more other inert diluents or catalytically active materials.

It is particularly preferred that the crude oil fly ash has been subjected to electron beam treatment. Electron beam treatment includes exposing crude oil fly ash to a stream of electrons to thereby after the structure of a precursor crude oil fly ash obtained directly as a reside from the combustion of crude oil. The precursor crude oil fly ash is formed as a by-product of conventional power generation by combustion of crude oil. Such conventional power generation processes mix a spray of crude oil with an oxidizing was such as ambient atmosphere to combust the hydrocarbon materials present in crude oil. The fly ash obtained from a conventional power generation plant is preferably Class F fly ash obtained from the combustion of a heavy mineral oil crude. Crude oil is generally combusted at a temperature of more than 1,000° C. in conventional power generation units.

The crude oil is preferably obtained from a mineral source such that the crude oil contains inorganic materials such as minerals present in dissolved or suspended form. When the crude oil is combusted the hydrocarbon materials are oxidized and released in the form of carbon dioxide. The carbon dioxide gas easily separates from inorganic and non-volatile materials that remain after combustion.

It is not necessary for the crude oil to undergo complete combustion. In a preferable embodiment to the invention crude oil combustion forms a precursor crude oil fly ash that contains carbon in addition to one or more non-carbon elements such as minerals. It is particularly preferred that combustion of crude oil forms a precursor fly ash that contains from 0.01 to 10 weight percent carbon based on the total weight of the fly ash. The carbon present in the fly ash is non-volatile carbon. The fly as may contain carbon such that 85-90% of any unburned carbon present in the fly as is carbon before electron beam treatment. The carbon in the precursor fly ash may be present in the form of graphite, graphene and/or may be present in the form of metallic carbides in which carbon is covalently bonded to one or more metal or mans group elements. The precursor crude oil fly ash may contain one or more additional and non-essential by-products from combustion such as sulfates, carbonates, nitrates, and other main group element-containing compounds or complexes that otherwise are not sufficiently volatile under the conditions of crude oil combustion to be separated during combustion.

Electron beam treatment of the precursor crude oil fly ash results in a chemical change to form a catalytic crude oil fly ash. The catalytic crude oil fly ash is distinguished from the precursor crude oil fly ash by either or both of physical and chemical characteristics. Physical characteristics may include properties such as tensile strength, resistance to impaction, and/or hardness. Chemical differences between catalytic and precursor crude oil fly ashes may include pH, chemical composition and chemical reactivity.

In a preferable embodiment of the invention precursor crude oil fly ash is obtained directly from a conventional power generation unit in which crude oil is combusted to release heat and energy. The precursor crude oil fly ash may be used in powder or particulate form. Preferably the precursor crude oil fly ash is formed into a solid particulate shape by pilling, compressing, briquetting, or bricking to form a regular three-dimensional shape. One or more binders, diluents and/or ancillary materials may be added to the precursor crude oil fly ash materials before the fly ash material is formed or shaped.

The precursor crude oil fly ash material, shaped or unshaped, is exposed to an electron beam under conditions effective to change one or more physical and/or chemical properties in a predetermined manner. Electron beam treatment may be carried out at ambient temperature, reduced temperature or elevated temperature. Preferably the temperature during electron beam treatment is controlled and held consistent from initiation of electron beam treatment through completion of electron beam treatment. In embodiments of the invention electron beam treatment is carried out at temperatures of from −10 to 200° C., preferably 20 to 150° C., more preferably, from 50 to 100° C.

In another favorable embodiment of the invention electron beam treatment is carried out concurrently with one or more other treatments which may include irradiation, heat treatment, exposure to an oxidizing or reducing gas, and the like. For example electron beam treatment of fly ash may include high power X-ray treatment. Preferably treatment consists of electron beam treatment and/or electron beam treatment in the absence of high power X-ray treatment.

Electron beam treatment is preferably carried out with a vertically-oriented accelerator type election beam system. An electron beam system having an energy of, for example, 0.1-50, more preferably 0.5-25, more preferably 1-10, preferably 2-8, more preferably 4-6 MeV and/or a power of combined accelerators of up to 100 kW is preferred. Treatment of fly ash is preferably carried out on a continuous basis such that bags or electron beam transmissive containers of the fly ash are conveyed through the electron beam on a conveyor. It is preferable that the electron beam fully penetrates and hilly exposes the entire volume of fly ash present in containers. In most electron beam treatment systems the fly ash is packaged up to a depth of about 10 cm.

Conveyance of the fly ash containers through the electron beam is usually carried out at a conveyor speed of from 0.3-24 meters/min such that sufficient electron beam treatment of the fly ash is obtained prior to use of the fly as to make MWCNTs. Minimum electron beam may range from 0.01 to 50 kGy, preferably from 0.1 to 40 Gy, preferably from 1 to 25 Gy, more preferably from 10 to 20 Gy. Conventional electron beam treatment systems used for food treatment and/or sterilization may be used to treat the fly ash in one aspect of the invention.

Electron beam treatment of fly ash after the chemical and physical environment of carbon present in the fly ash. For example, electron beam treatment may result in re-hybridization of carbon atoms present on or in the fly ash. Electron beam treatment may strip hydrogen atoms (e.g., protons) from carbonaceous material in fly ash thereby leading to a re-hybridization of the carbon. Carbon present in fly as and having a $sp^3$ hybridization may re-hybridize to form carbon having $sp^2$ hybridization. In this respect the electron beam treatment results in the formation of unsaturated carbon-based material in the fly ash.

It is preferable that electron beam treatment of the fly ash is carried out under an inert gas atmosphere and/or an atmosphere in which fly ash is flushed with an inert gas or gas blanket during electron beam treatment. Removal of oxidizing gases and/or moisture helps prevent reaction of the fly ash with atmospheric components and/or water which may otherwise deactivate or inhibit the catalytic function of the electron beam-treated fly ash.

Carbon having $sp^2$ hybridization has three equivalent $sp^2$ orbitals and one unhybridized 2p orbital. Graphite contains carbon with $sp^2$ hybridization in which the $sp^2$ bonding orbitals around a central carbon nucleus are coplanar and oriented at 120° with respect to one another. Such hybridization forms a framework of strong σ bonds and π bonds that may be at least partially delocalized. The coplanar framework of σ bonds provides the two-dimensional sheet form of graphite.

In one aspect of the invention re-hybridized carbon atoms (e.g., $sp^2$ hybridized carbon atoms) in the electron beam-treated fly ash act as nucleation centers for the growth, crystallization and/or propagation of multiwalled carbon nanotubes. During synthesis of carbon nanotubes the passage of an olefinic material over an electron beam-treated fly ash results in close orientation and/or contact of the $sp^2$ hybridized carbons of the olefinic material and the $sp^2$-hybridized carbon atoms of the electron beam-treated fly ash. As olefinic and/or other gaseous carbonaceous materials come into contact with $sp^2$ hybridized carbon atoms bonded to or attached to a fly ash substrate, the growth of multiwalled carbon nanotubes begins. Propagation and growth of the walls of carbon nanotubes is initiated at free bonding sites (sometimes referred to as dangling bonds) that are $sp^2$ hybridized and may represent, for example, carbon atoms bonded to fly ash and/or encased in fly ash that has been subjected to electron beam treatment.

The dimensional characteristics of the MWCNTs formed in the process of the invention may be tailored by controlling the amount of carbon material present in fly ash and/or controlling the degree of hybridization, e.g., the amount of carbon atom hybridized into an $sp^3$ form. Changing the amounts of hybridized carbon atoms and/or the density of $sp^2$ hybridization allows control of MWCNT width, a thickness and/or degree of encapsulation.

The precursor crude oil fly ash material obtained from a power generation unit may be used as is prior to electron bean treatment, that is without further purification or alteration, or preferably is first cleaned with demineralized water. Washing a precursor crude oil fly ash having an initial pH of from 6 to 8 forms a material having a pH of around 2, e.g., from 1.5-7, preferably 2-5 more preferably 2-4. After the precursor crude oil fly ash is washed a metal oxide such as iron oxide ($Fe_2O_3$) may be mixed with the washed precursor crude oil fly ash. Other minerals, binders and ancillary agents may likewise be added. Preferably mainly a metal oxide such as iron oxide is added to the washed precursor crude oil fly ash. The metal oxide is preferably added in an amount of from 0.1-10% based on the weight of the precursor crude oil fly ash, preferably from 0.5-8%, 1-5% or 1.5-3% by weight. The thus obtained metal oxide-comprising precursor crude oil fly ash may then be subjected to electron beam treatment.

Electron beam treatment is preferably carried out on a shaped structure having a thickness of 10 cm or less, preferably 5 cm or less and more preferably in the form of briquettes and/or pills having a largest dimension of 0.1-5 cm. Electron beam treatment is preferably carried out such that the fly ash is sealed from and/or not exposed to ambient atmosphere during treatment. In another embodiment of the invention the precursor crude oil fly ash is sealed in reactors containing one or more reactants in the form of a solid, liquid or gas to further alter or modify the chemical composition of the precursor crude oil fly ash during electron beam treatment.

Prior to combustion the crude oil may be modified to include one or more additional ingredients. In a preferable embodiment of the invention one or more magnesium-containing compounds is added to crude oil prior to combustion. The magnesium compound is mixed with the heavy crude oil in an amount of from 0.001 to 1, preferably 0.01 to 0.1 weight percent based on the total weight of the crude oil. The magnesium compound is added as a liquid or liquid composition to the crude oil to thereby provide a crude oil composition that is relatively uniform and homogeneous prior to combustion. Alternately the magnesium compound and/or magnesium metal may be added as a suspension of magnesium material in an oil carrier prior to combustion.

A magnesium oxide material such as GTT124.11 Base: Magnesium Sulphonate. Magnesium 11 wt. % may be added to the crude oil prior to combustion and/or to aid the flow of oil through pipelines. The magnesium additive may also serve to raise the pH and to curb the impact of acid as well as lead to improved combustion. A modern system relies on the addition of water to heavy fuel so that the heavy fuel can be efficiently transferred. When water is present the crude oil composition is preferably in the form of an emulsion.

The precursor crude oil fly ash typically contains about 80% by weight of carbon, up to 5% by weight silicon, up to 5% by weight aluminum oxide, up to 10% by weight oxygen, up to 10% by weight, sulfur and up to 10% by weight of one or more metals. Preferably the precursor crude oil fly ash contains at least 75% by weight carbon, up to 2% silicon, up to 2% aluminum oxide, from 0.5-10% oxygen, from 0.5-10% sulfur and from 0.5-10% of one or more metals.

Subsequent to electron beam treatment the chemical composition of the fly ash catalyst changes. The electron beam-treated material preferably contains at least 90% carbon, up to 0.5% aluminum oxide, up to 1% silicon oxide, up to 1% iron oxide, up to 2% vanadium oxide and up to 10% sulfur. More preferably the electron beam-treated fly ash catalyst contains at least 85% carbon, up to 0.25% aluminum oxide, up to 0.3% silicon oxide, up to 3.5% iron oxide, up to 1.5% vanadium oxide and up to 8% sulfur. The metals present in the electron beam-treated fly ash catalyst are preferably iron and vanadium present in the form of iron oxide ($Fe_2O_3$) and vanadium oxide ($V_2O_5$). Preferably the total amount of iron oxide and vanadium oxide in the electron beam-treated fly ash catalyst is up to 10% by weight, preferably up to 8% by weight, more preferably up to 5% by weight and most preferably from 2.5-4.5 wt. %.

In one aspect of the invention the inclusion of a magnesium component in the crude oil permits formation of a vanadate, for example, the reaction of $V_2O_5$ with a magnesium oxide forms $Mg_3V_2O_8$, e.g., an orthovanadate.

In a most preferable embodiment of the invention a heavy crude oil obtained from Saudi Arabia. For example, the crude oil may be a Saudi oil (crude oil) containing an amount of carbon between 84-87%, an amount of hydrogen between 11-14%, an amount of sulfur between 0-3%, an amount of nitrogen about 2.0%, and the higher the carbon content the higher the density of oil and become heavy. So-called oil-Saudi sour Crude is most preferred. Carbon is present in the ash content of heavy fuel at approximately 0.1% based on the total weight of the ash. Carbon in the ash content of crude oil close to 0.01% based on the total weight of the ash.

The particular composition of the crude oil is such that it comprises a mixture of hydrocarbons which can be distilled to provide both light distillates, metal distillates, and heavy distillates together with one or more residues comprising components such as heavy fuel oil, waxes, greases and asphalts. The crude oil may generally contain at least 80% carbon, at least 5% hydrogen, up to about 5% nitrogen, up to about 5% oxygen, and up to about 10% sulfur. Metals are generally present in an amount of less than 0.1% by weight based on the total weight of the crude oil. Preferably the crude oil from which the precursor crude oil fly ash is obtained by combustion contains from 83-87% carbon, 10-14% hydrogen, 0.1-2% nitrogen, 0.05-1.5% oxygen, and 0.05-6.0% sulfur. Metals are desirably present in an amount of less than 0.05% by weight. The crude oil contains a number of chemical components including paraffins, naphthenes, aromatics and asphaltenes. Paraffins are desirably present in an amount of 15-60%, naphthenes in an amount of 30-60%, aromatics in an amount of 3-30% and asphaltenes are preferably present in an amount of less than 10% by weight.

The crude oil fly ash may be obtained from gases leaving the combustion chamber of a conventional power generation unit. Gases generated by combustion of crude oil may contain suspended particulate matter having one or more components making up Class Fly ash. The fly ash may be separated from the exhaust gases of crude oil combustion by electrostatic precipitators and subsequently collected. Thus the crude oil fly ash may contain materials collected both from a combustion chamber and/or materials isolated from gases emitted during crude oil combustion. The most important means for the disposal of ash resulting from the combustion of fuel in steam power plants is Electrostatic Precipitator. The principle to charge the ash particles (e.g., negatively charged fly ash particles) and pass the charged particles to a positively charged substrates so that the ash particles precipitate from the ash flow.

In another embodiment of the invention the crude oil from which the precursor crude oil fly ash is obtained has first been subjected to one or more distillation operations to separate lighter hydrocarbon materials. The resultant crude oil residue obtained after distillation can be combusted to form the precursor crude oil fly ash. It is more preferred, however, that crude oil is combusted prior to any distillation process to thereby obtain the precursor crude oil fly ash. The crude oil is preferably a heavy fuel oil 380-180.

The fly ash catalyst may be used in the different forms in the process of the invention. In one embodiment of the invention fly ash is used in the form of a shaped article such as a pill, briquette or tablet. In its shaped form the catalyst is preferably used in a fluidized bed CVD device. The shaped forms are suspended in a gaseous mixture that contains a hydrocarbon and one or more optional gases that may have a reducing or oxidizing effect. As the gaseous mixture, which may further contain one or more optional inert gases, passes through the fluidized bed carbon nanotubes form on the catalyst particles and grow to a particular length before breaking off and being collected either as a precipitate or suspended in the gas flow passing through the fluidized bed. The length of the carbon nanotube can be tailored depending on the gas flow through the fluidized bed. At higher gas flows the fluidized bed may have a greater tendency to undergo particle-particle interaction whereby carbon nanotubes are broken off the surface of the shaped articles as the particles collide into one another in the fluidized bed. Once broken off the particle, the nanotube is either carried out of the CVD device by gas flow or precipitates in collection point in the CVD device.

When used in the form of a shaped article the catalyst is preferably composed of nanoparticles of fly ash material. The nanoparticles are held together by compressive forces and/or by using a binder. Nanoparticles of the ash catalyst material are exposed on the surface of formed articles and provide a base from which carbon nanotubes may grow.

In another embodiment the fly ash catalyst is used in a powder form. The particles of fly ash catalyst in the powder form material have a particle size of preferably from 10 micron to 1 mm, preferably from 50 micron to 0.5 mm, preferably from 100 micron to 1000 micron. The diameter of carbon nanotubes formed by the process of the invention can be tailored according to the size of the nanoparticles. When the fly ash catalyst comprises catalytically active nanoparticles having an average particle size of 10 nm or less the formation of single-walled carbon nanotubes may be favored. At larger particle sizes multi-walled carbon nanotubes are formed. As the particle size increases the diameter and number of nested tubes may also increase.

The fly ash catalyst may be applied to a substrate such that carbon nanotubes are formed directly on a substrate to thereby form a material having a surface from which multi-walled carbon nanotubes project. The fly ash catalyst may be adhered to a substrate surface by use of a binder or adhesive or alternately may be physically absorbed onto the substrate surface onto which multi-walled carbon nanotubes are to be grown. The substrate may include any material which desirably has a multi-walled carbon nanotube surface structure. For example, metallic materials and alloys may be first coated with the fly ash catalyst then subjected to CVD such that carbon nanotubes are grown and adhered onto the surface of the metallic material. Non-metallic substrates such as silicon dioxide may also be used as a substrate on which multi-walled carbon nanotubes may grown. As is the case for metallic substrates the fly ash catalyst is first adhered or deposited onto the non-metallic surface on which multi-walled carbon nanotubes are to be grown.

The fly ash catalyst may be applied as a liquid and/or as a solid onto the substrate. When applied as a liquid, preferably in the form of a shiny, an even coat of fly ash catalyst can be formed on the substrate surface together with one or more optional binders or adhesive materials. After application of the slurry the thus-coated substrate material may be washed or treated with one or more additional liquids such that individual faces of nanoparticulate fly ash catalysts are exposed on the surface of the substrate. Carbon nanotubes are then grown from the exposed faces of the nanoparticulate fly ash catalyst.

When grown onto a substrate surface the multi-walled carbon nanotubes may be oriented in any manner including horizontally, vertically stacked, or in an intertwined form. Horizontally oriented multi-walled carbon nanotubes preferably lay on the surface of the substrate and are oriented lengthwise parallel to the surface of the substrate. In a particularly preferred embodiment of the invention the multi-walled carbon nanotubes are grown on a substrate surface such that the substrate is covered with a plurality of multi-walled carbon nanotubes laid side-by-side in a parallel orientation with a surface of the substrate. In another embodiment of the invention the carbon nanotubes are grown vertically oriented from the surface of the substrate to form a "forest" of multi-walled carbon nanotubes having one terminus blocked at the base end by the surface of the substrate and another terminus that may be open or closed separated from the surface of the substrate by the carbon nanotube. It is not necessary for the vertically-oriented multi-walled carbon nanotubes to have a perfectly vertical arrangement and/or be arranged perpendicular to the surface of the substrate. In embodiments the carbon nanotubes may grow plain of the substrate surface where individual carbon nanotubes are arranged in the same orientation as other multi-walled carbon nanotubes or farm a forest in which the nanotubes are vertically oriented to different degrees in a random manner.

In another embodiment of the invention the carbon nanotubes grown on a substrate surface are intertwined with one another. In this aspect of the invention each carbon nanotube is a separate and distinct nanotube that is not necessarily chemically connected to neighboring carbon nanotubes but may be physically in contact with one or more carbon nanotubes also present on the substrate surface. In the entwined form the carbon nanotubes preferably have a three-dimensional structure such that curves, knots, and orientations in three dimensions define the vector in which the carbon nanotube is grown.

When grown in a stacked orientation the carbon nanotubes lay on top of one another, preferably in the horizontally oriented form.

Figure 2:
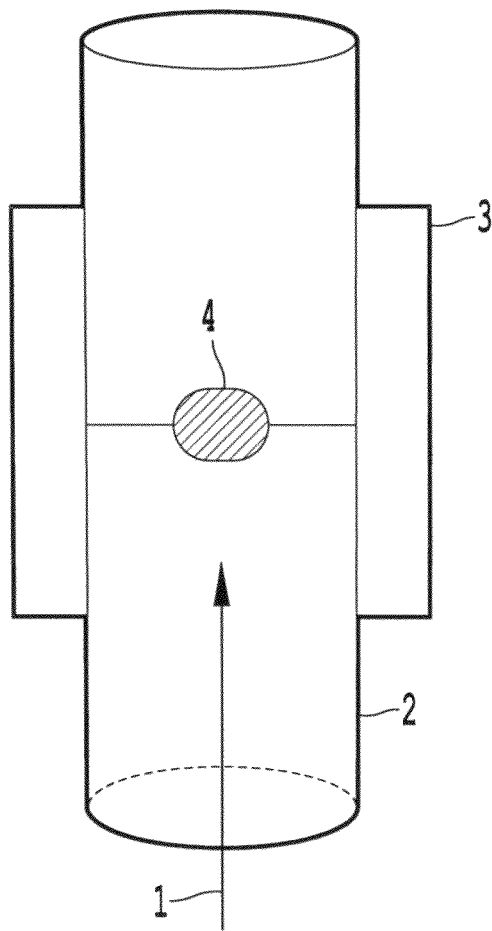
FIG. 2 shows an apparatus for use when forming a multi-walled carbon nanotube according to an embodiment of the invention.

The CVD device may be a vertical and/or horizontal furnace in which the fly ash catalyst is suspended, in fluidized bed form or otherwise, in a stream of hydrocarbon-containing gas. FIG. 2 describes an embodiment of the invention in which a hydrocarbon gas (1) is passed through a vertically oriented tube in which the fly ash catalyst (4) is suspended. The fly ash catalyst is heated to an appropriate temperature with a hater (4) such that the hydrocarbon-containing gas contacts the fly ash catalyst at temperatures sufficient for growing the carbon nanotube. The carbon nanotube grows on the surface of the fly ash catalyst particles until a critical length is reached. The multi-walled carbon nanotube then breaks from the surface of the catalyst particle and is collected at the bottom of the tube.

The CVD device may also be horizontally oriented which is especially useful in embodiments of the invention in which a substrate is coated with a multi-walled carbon nanotube-containing surface. A substrate coated with catalyst is either vertically, horizontally or inclined in the gas flow. The substrate and the catalyst present on the surface thereof is heated to the temperature at which carbon nanotube growth is initiated. As the gas flow passes over the surface of the substrate and contacts the fly ash catalyst, carbon nanotubes are grown and a coated substrate surface is thereby formed.

The growth rate, orientation and physical structure of the carbon nanotubes, grown either on a substrate or as individually collected tubes, can be modified by changing growth conditions such as the gas flow rate, heat of catalyst, orientation at which the gas flow impinges upon the catalyst and/or substrate surface and the like. In one embodiment of the invention the substrate is concurrently heated and treated with a plasma such as an RF plasma. The plasma may serve to hyperactivate the fly ash catalyst and/or promote inter-tubule growth between carbon nanotubes adhered to the same substrate surface.

The hydrocarbon-containing gas contains at least one hydrocarbon. The hydrocarbon may be saturated or unsaturated, aliphatic or aromatic. Examples of hydrocarbons include alkanes, alkenes, alkynes, arenes and polyaromatic hydrocarbons. The hydrocarbon preferably has a boiling point such that it is gaseous or near gaseous at ambient temperature. Examples of preferred hydrocarbons include methane, ethane, propane butane, pentane, hexane, heptane, octane, nonane and decane. Preferred alkenes include ethylene, propylene, butene, pentene, hexene, heptene, octene, nonene and decene. Alkynes having more than one unsaturated bond such as butadiene may likewise be used as a hydrocarbon. Preferred alkynes include acetylene, propine, butine, pentine, hexine, heptine, octine and nonine. As is the case for alkene-type hydrocarbons the alkyne-type hydrocarbon may contain two or more alkynyl substituents. The hydrocarbon may be linear, branched or cyclic in structure. It is particularly preferred that the hydrocarbon-containing gas comprise at least acetylene.

The hydrocarbon-containing gas preferably comprises one or more additional gases. The additional gas is preferably carbon monoxide. Other gases may be included in addition to or in place of carbon monoxide including carbon dioxide hydrogen, water, NO, $O_2$, and other gases that may act as reductants or oxidants.

The hydrocarbon-containing gas may also contain aromatic compounds such as benzene, toluene, xylene and heteroatom-containing aromatic compounds such as butylated hydroxy toluene, cresol and the like.

The hydrocarbon-containing gas may include one or more additional gases present as a diluent or inert substance. Examples include nitrogen, argon, krypton, and helium.

In a preferable embodiment of the invention CVD is carried out with a hydrocarbon gas that contains acetylene and carbon monoxide in a ratio of 10:90-90:10 vol/vol. In other embodiments the ratio of gases is 10:80-80:20, 30:70-70:30, 40:60-60:40 and 50:50.

The CVD device is preferably operated in a low temperature realm at a pressure of from 0.1-700 mmHg, preferably 1-500 mmHg, preferably 10-200 mmHg. The hydrocarbon-containing gas is preferably metered into the CVD device in an amount sufficient to provide a growth rate of approximately 10 nm/min or greater.

CVD is preferably carried out at a temperature of from 500-1400° C., preferably 600-1300° C., preferably 700-1100° C., preferably 800-1000° C. and preferably about 900° C. The temperature is the temperature of the catalyst material which is in contact with the hydrocarbon-containing gas.

Figure 3A:
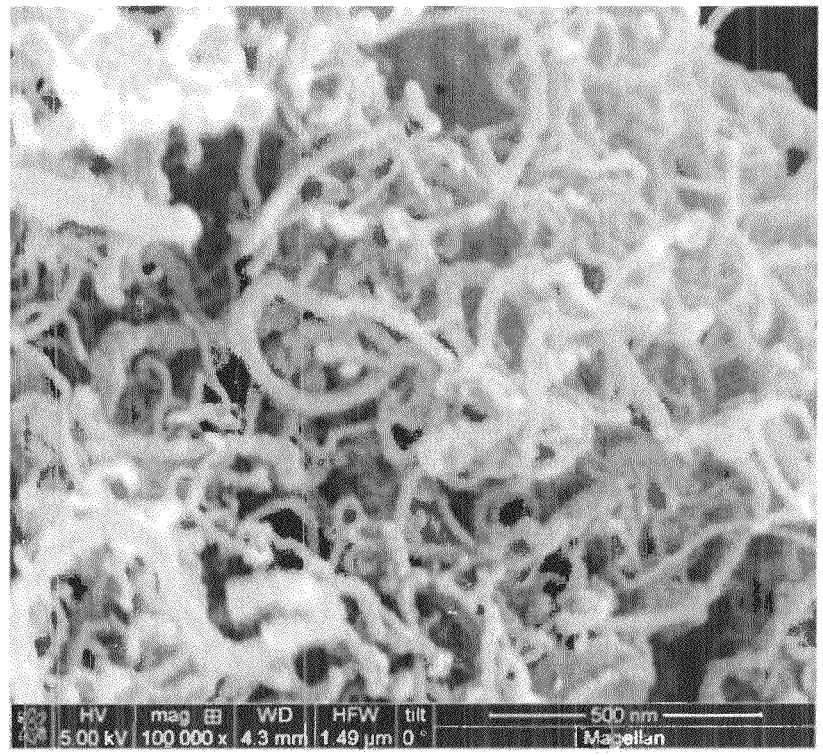
FIG. 3($a$) shows an electron micrograph of a multi-walled carbon nanotube formed by a process of the invention.
Figure 3B:
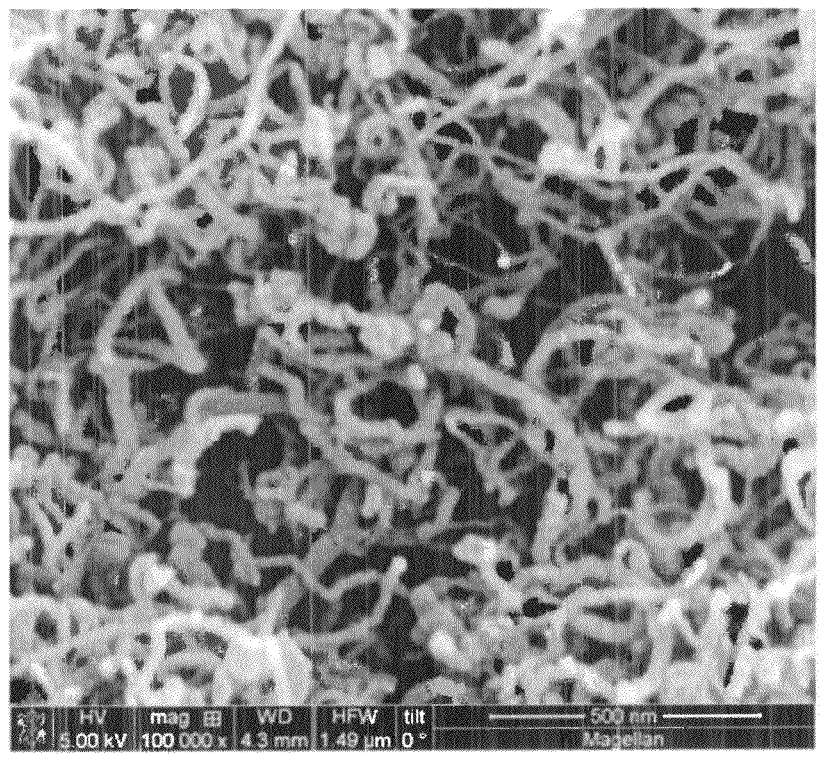
Figure 4:
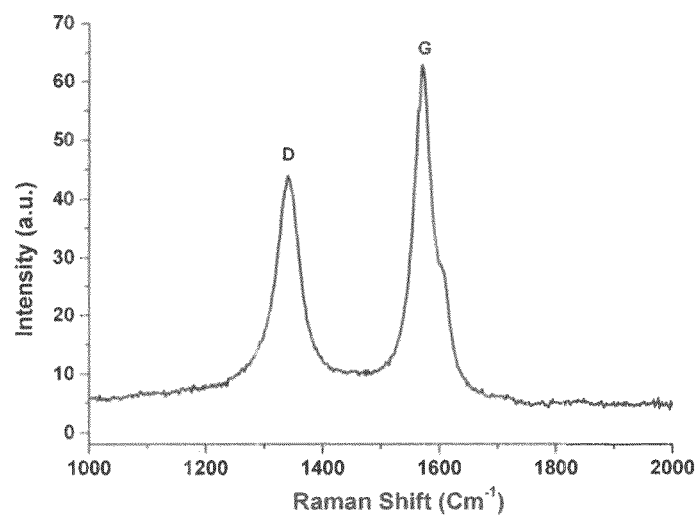
FIG. 4 shows a Raman spectrum for a multi-walled carbon nanotube product formed by the process of the invention.

FIGS. 3(a) and 3(b) provide SEM (scanning electron microscopy) images of multi walled carbon nanotubes made according to the process of the invention. FIG. 4 shows a Raman spectrum for a multi-walled carbon nanotube product formed the process of the invention.

Figure 5A:
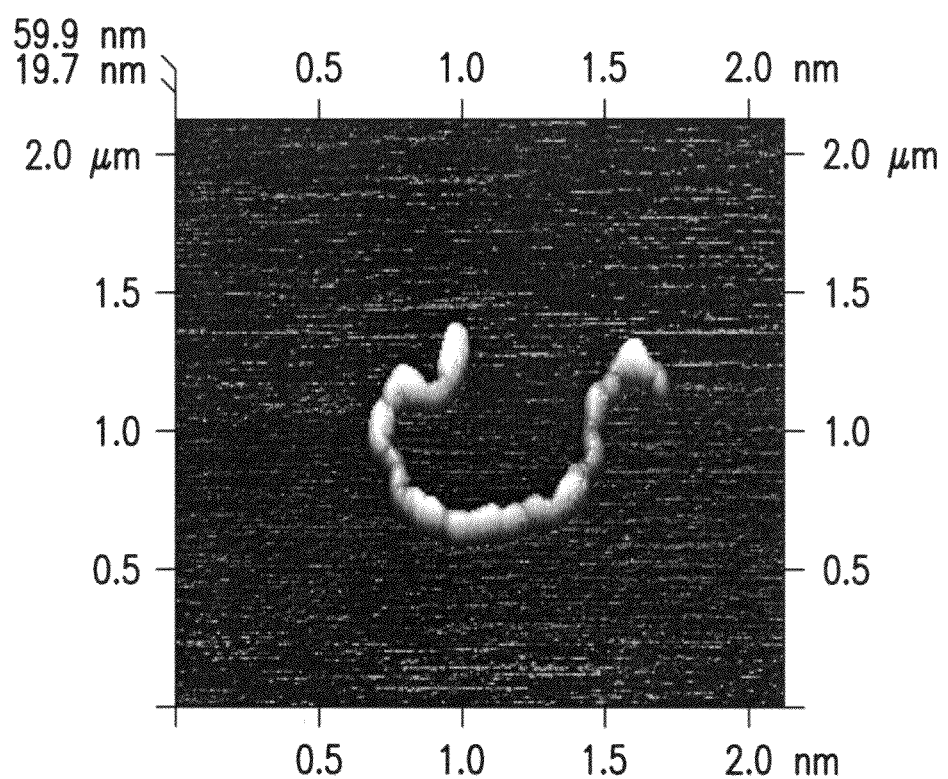
FIG. 5 shows an atomic force microscopy image of carbon nanotubes formed according to a process of the invention.
Figure 5B:
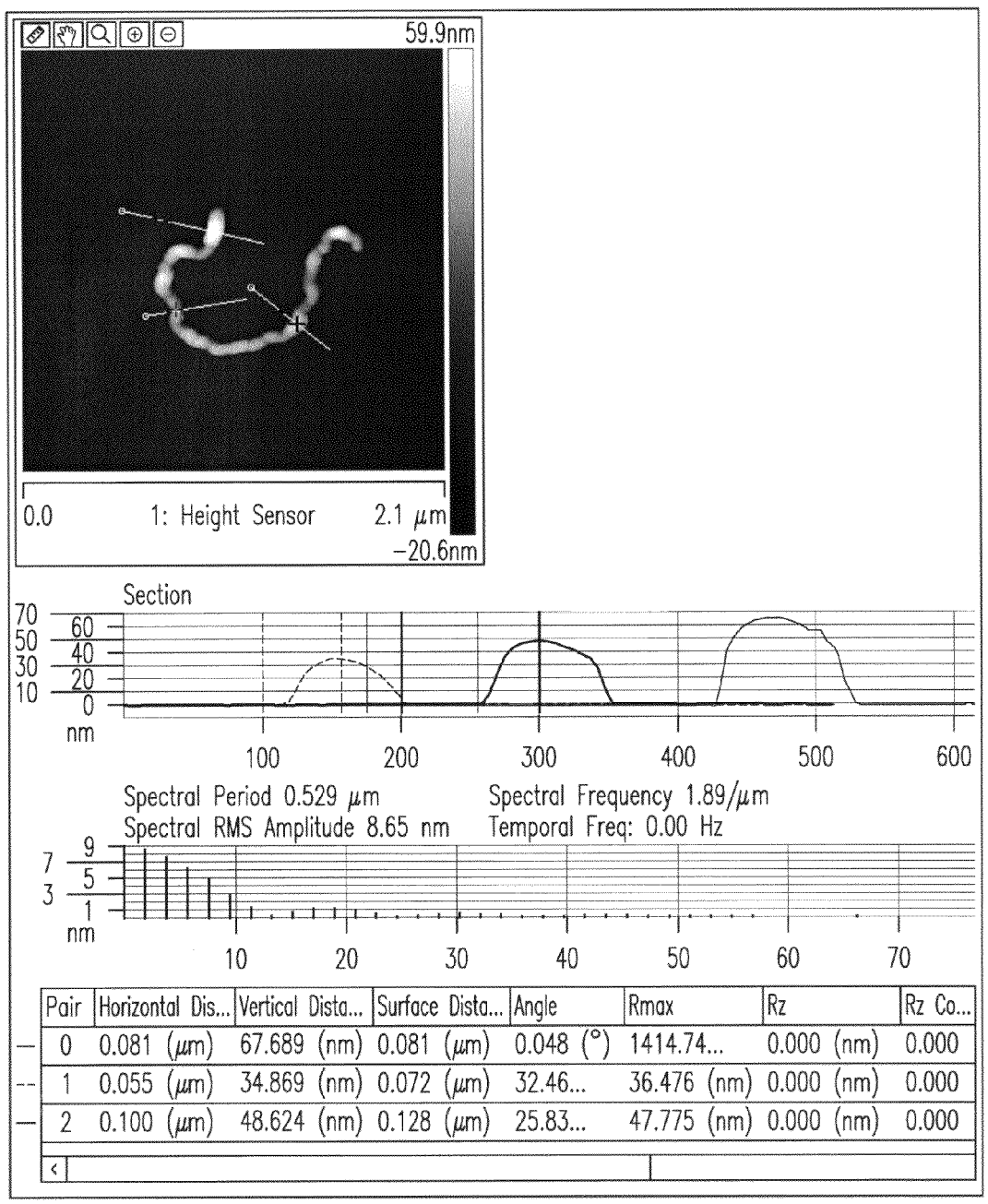
Figure 7A:
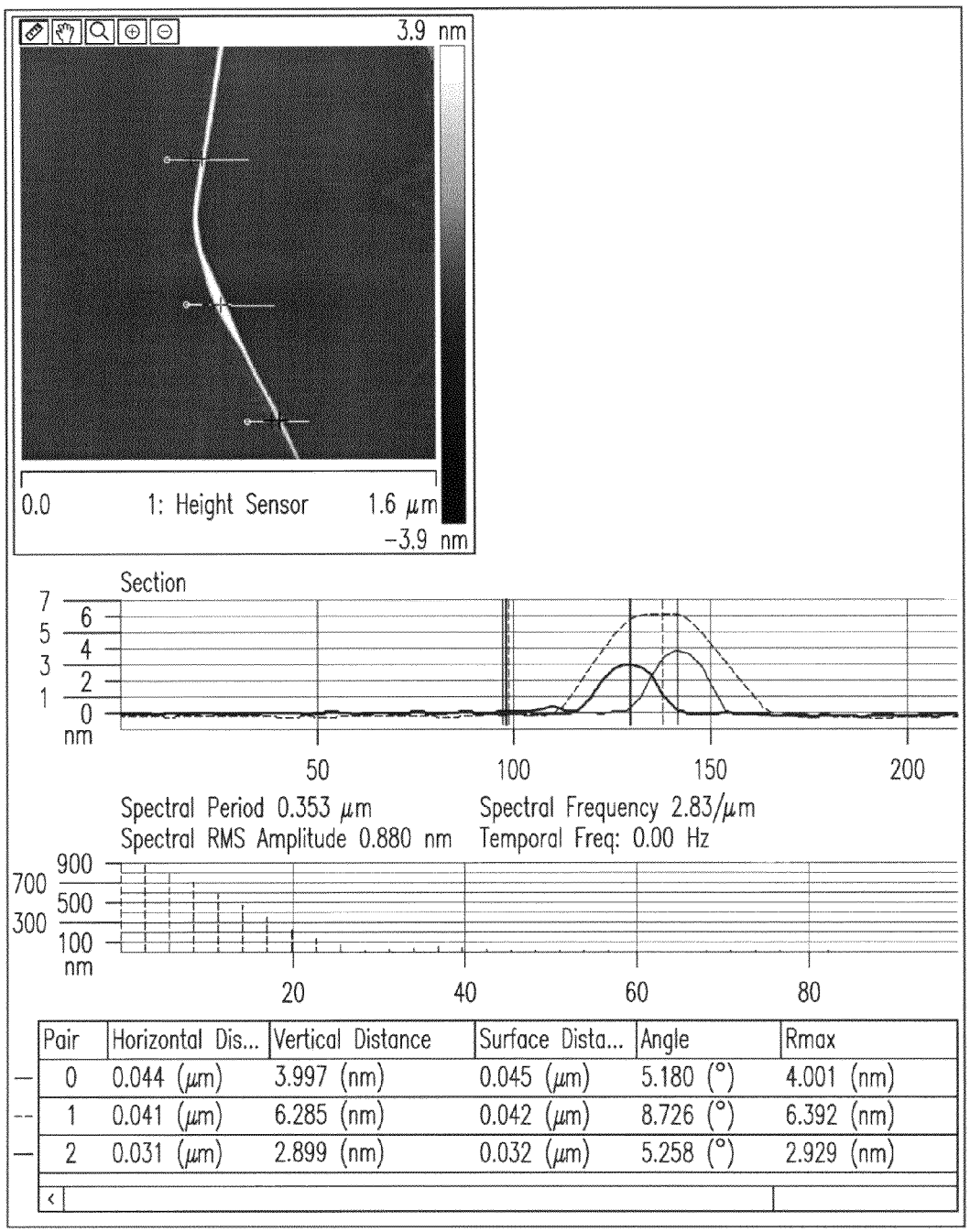
FIG. 7 shows elastic modulus changes of MWCNTs of the invention.
Figure 7B:
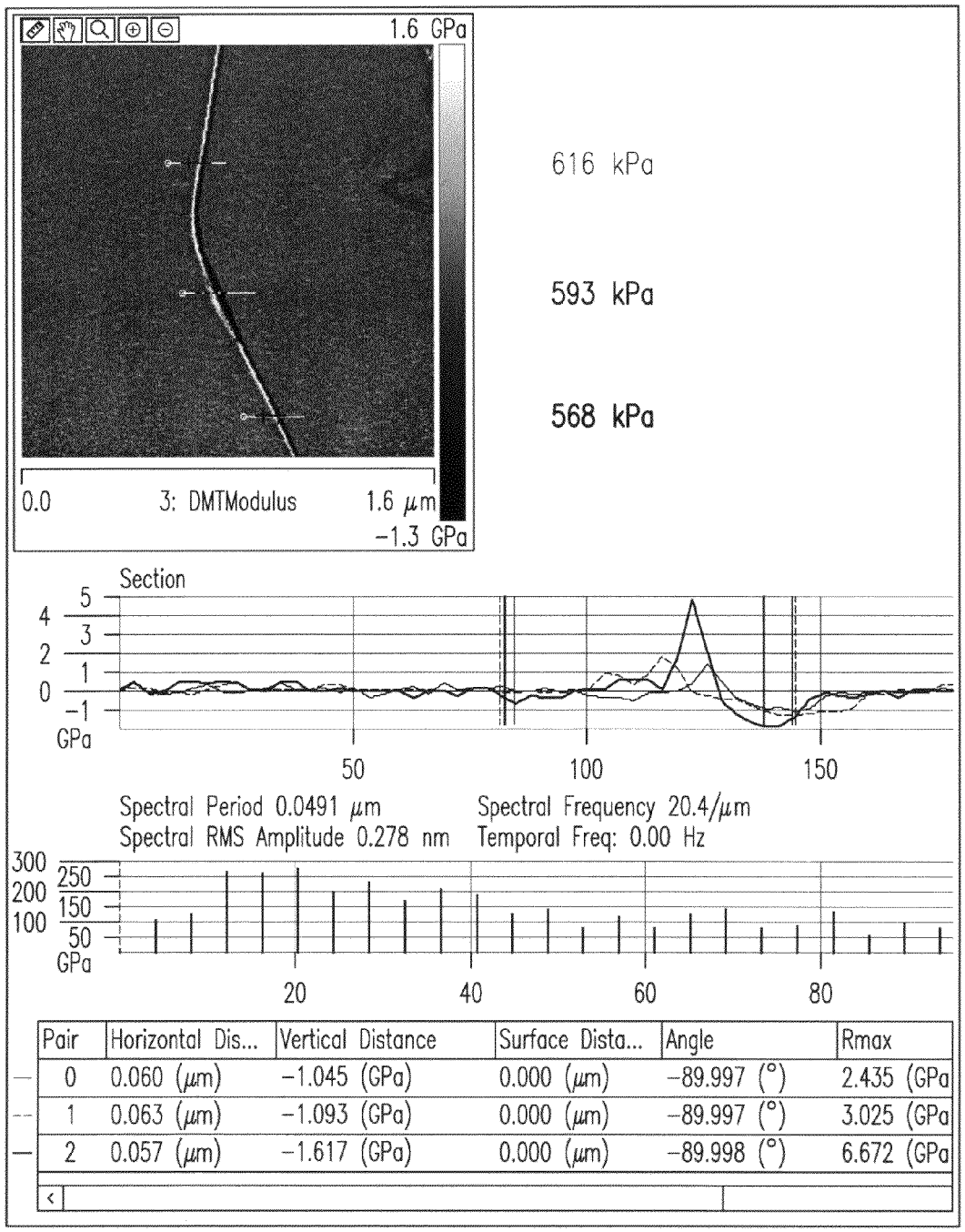
Figure 8A:
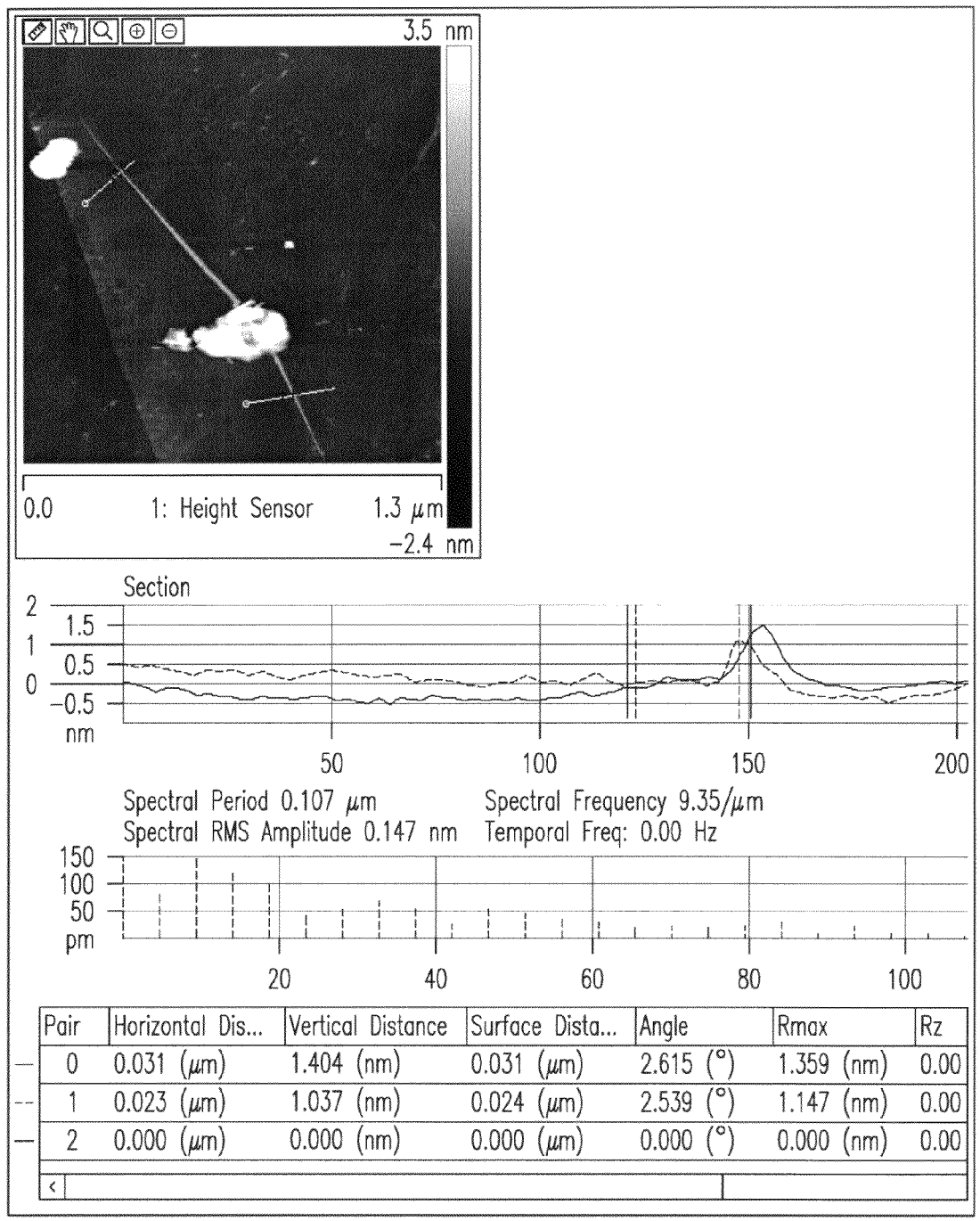
FIG. 8 shows elastic modulus changes of MWCNTs.
Figure 8B:
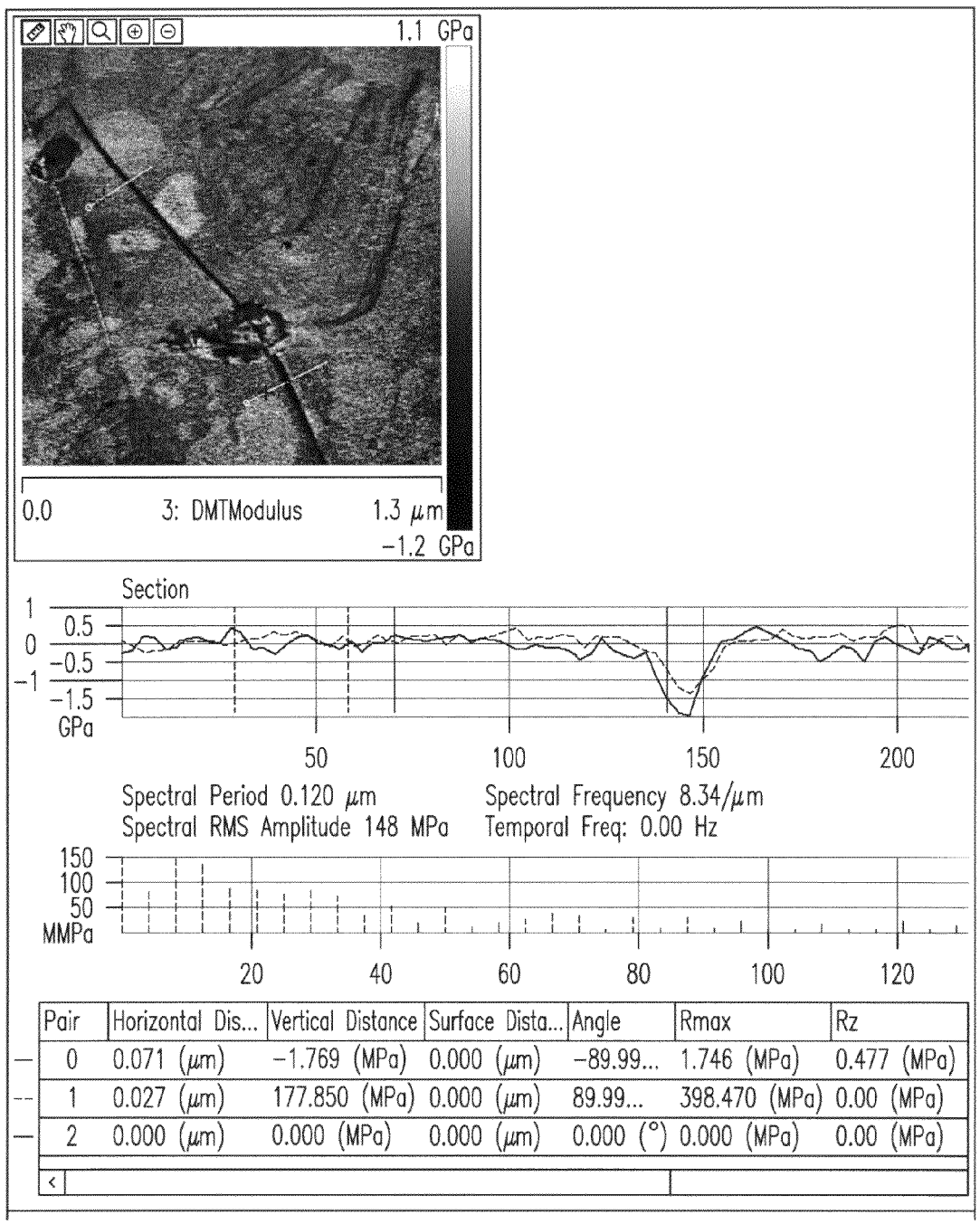
Figure 9:
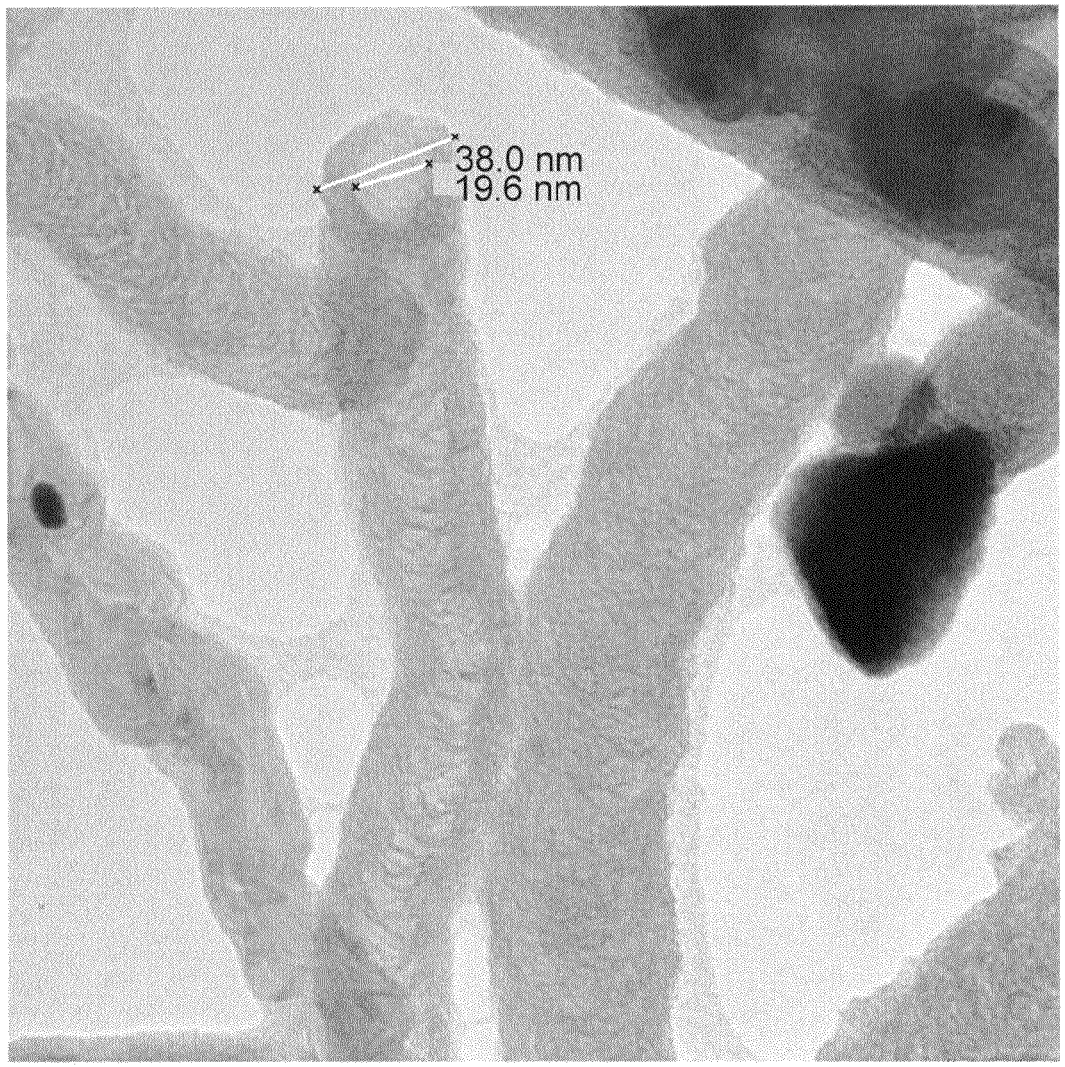
FIG. 9 shows a TEM of the MWCNTs.
Figure 10:
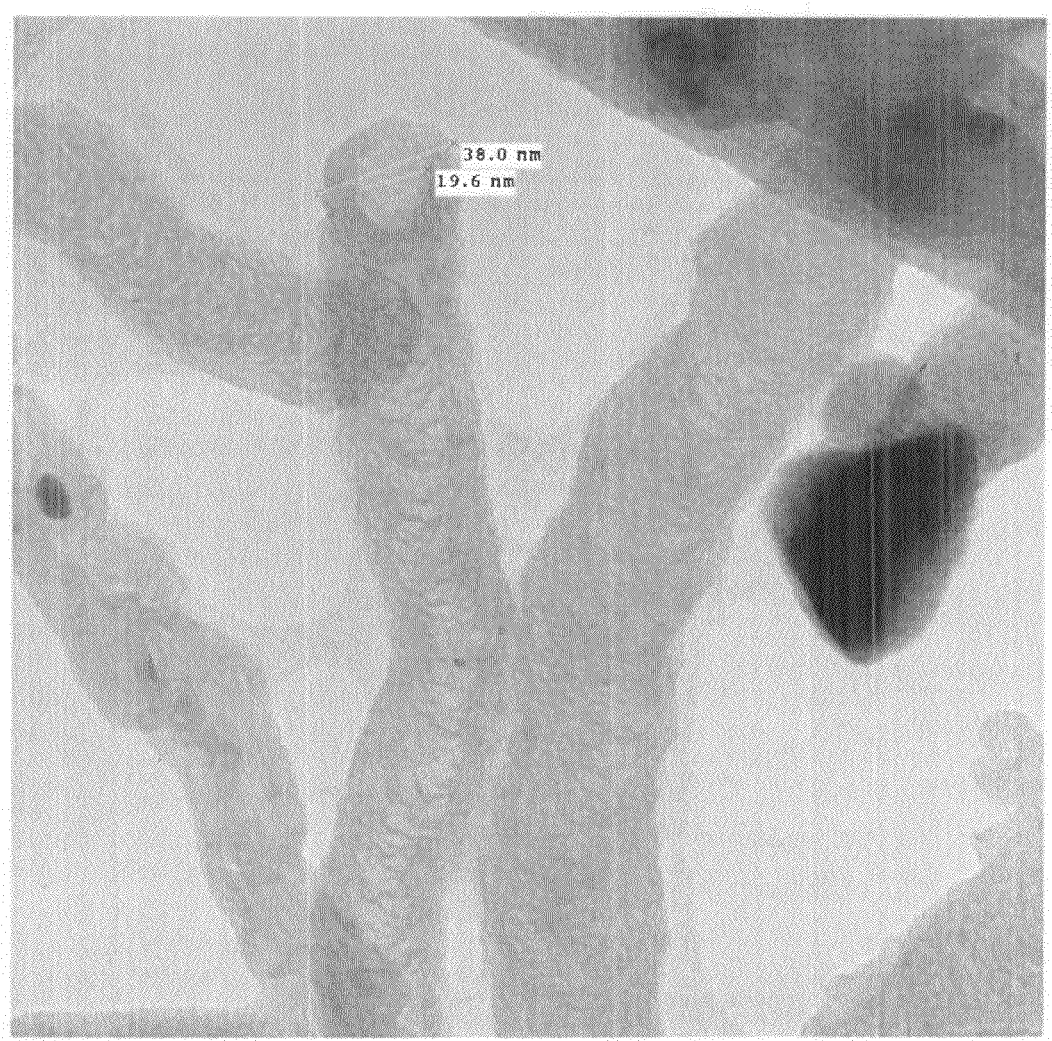
FIG. 10 shows a TEM of the MWCNTs.
Figure 11:
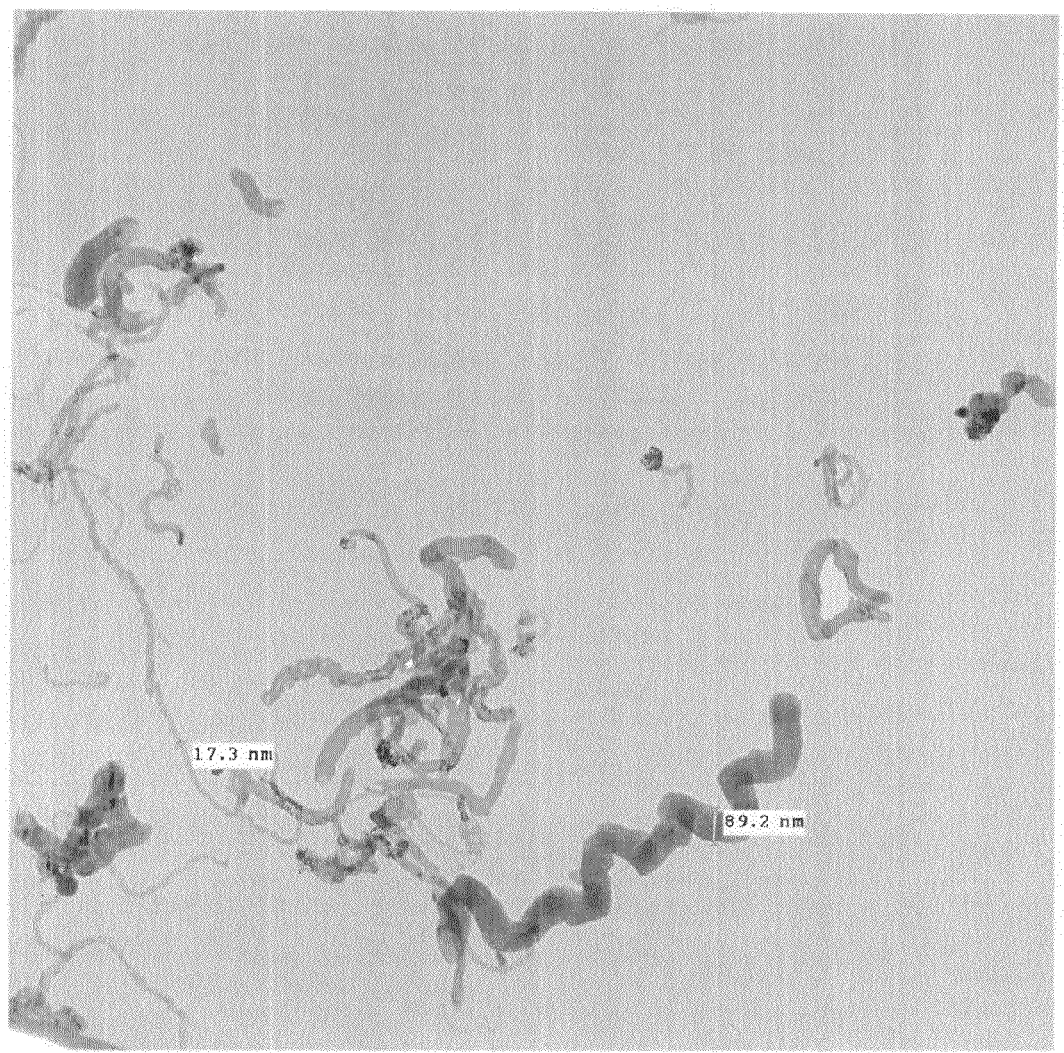
FIG. 11 shows a TEM of MWCNTs of different lengths, morphology and dimensions.
Figure 12:
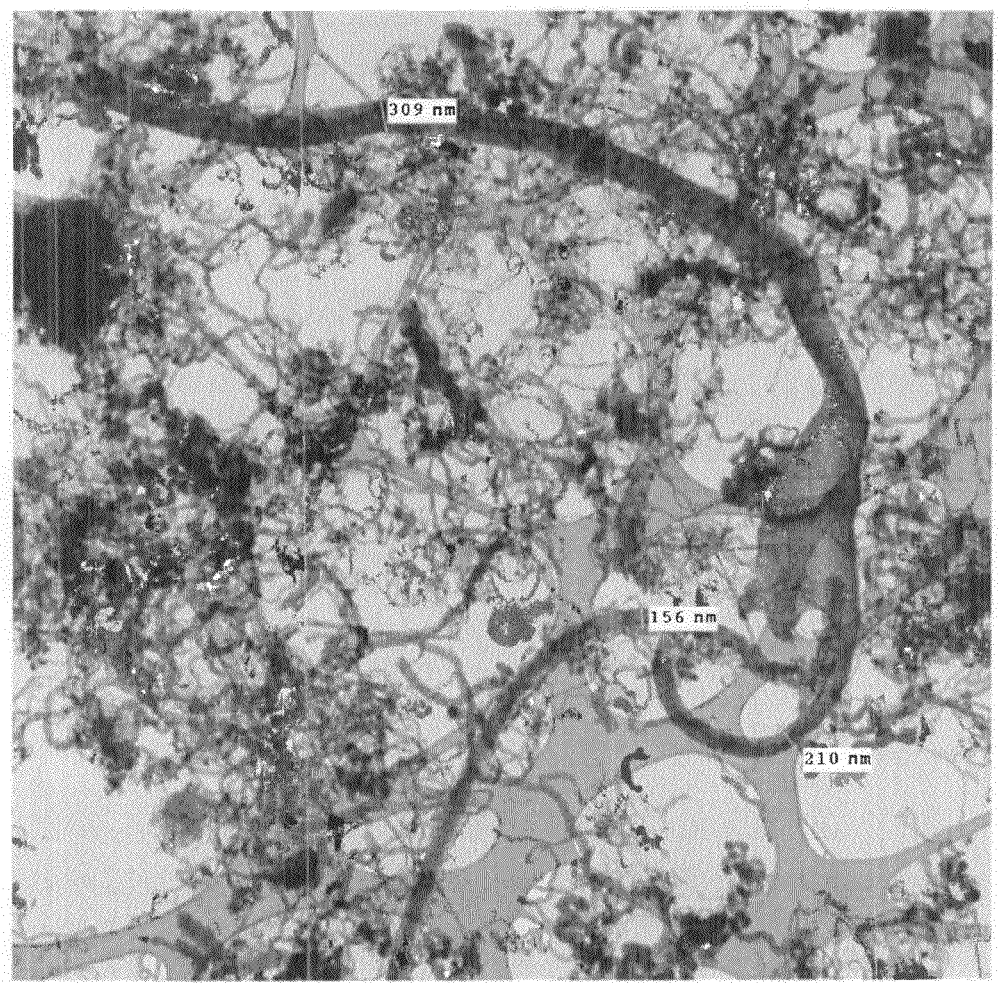
FIG. 12 shows MWCNTs on a substrate material.
Figure 13:
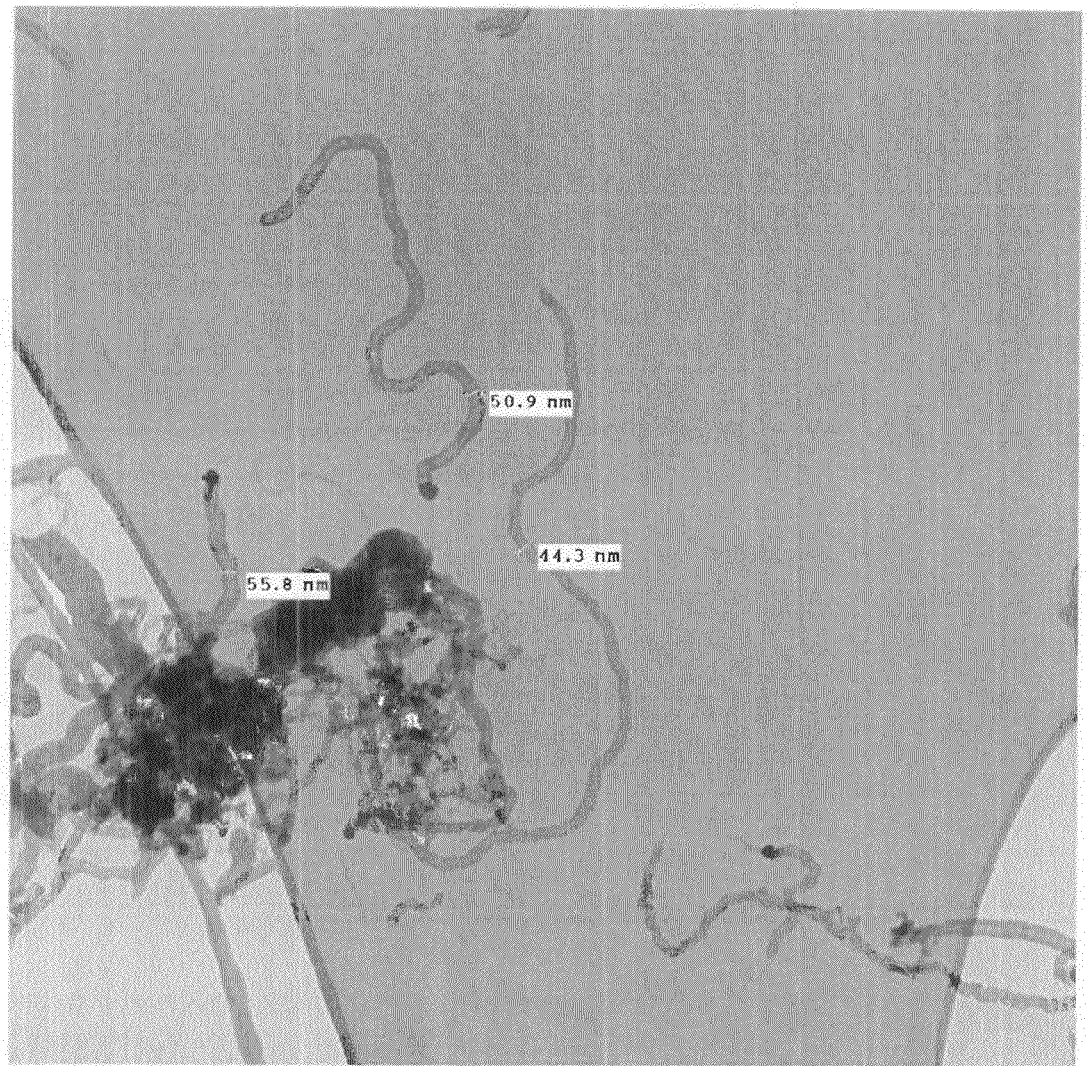
FIG. 13 shows a TEM of the MWCNTs.
Figure 14:
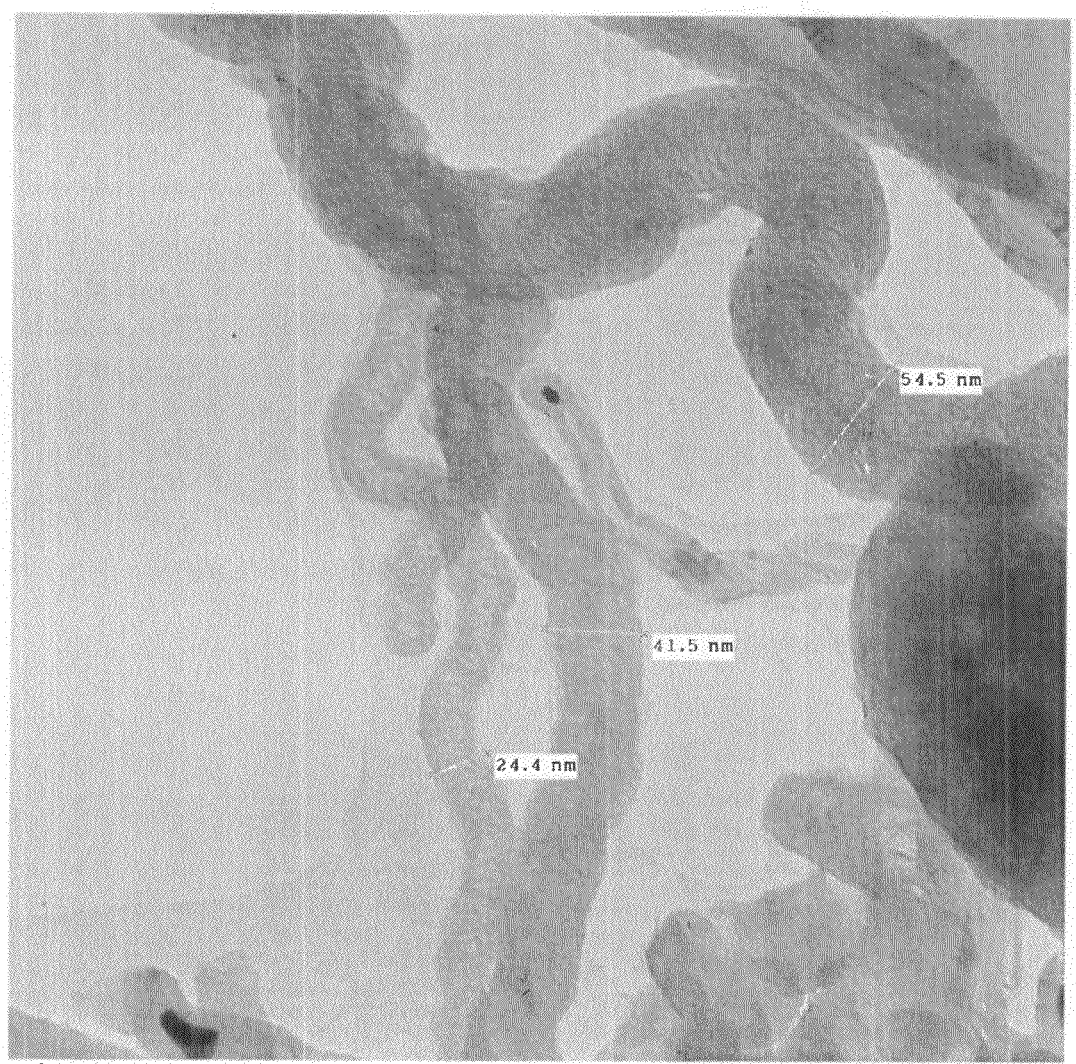
FIG. 14 shows a TEM of the MWCNTs with particular dimensions.
Figure 15:
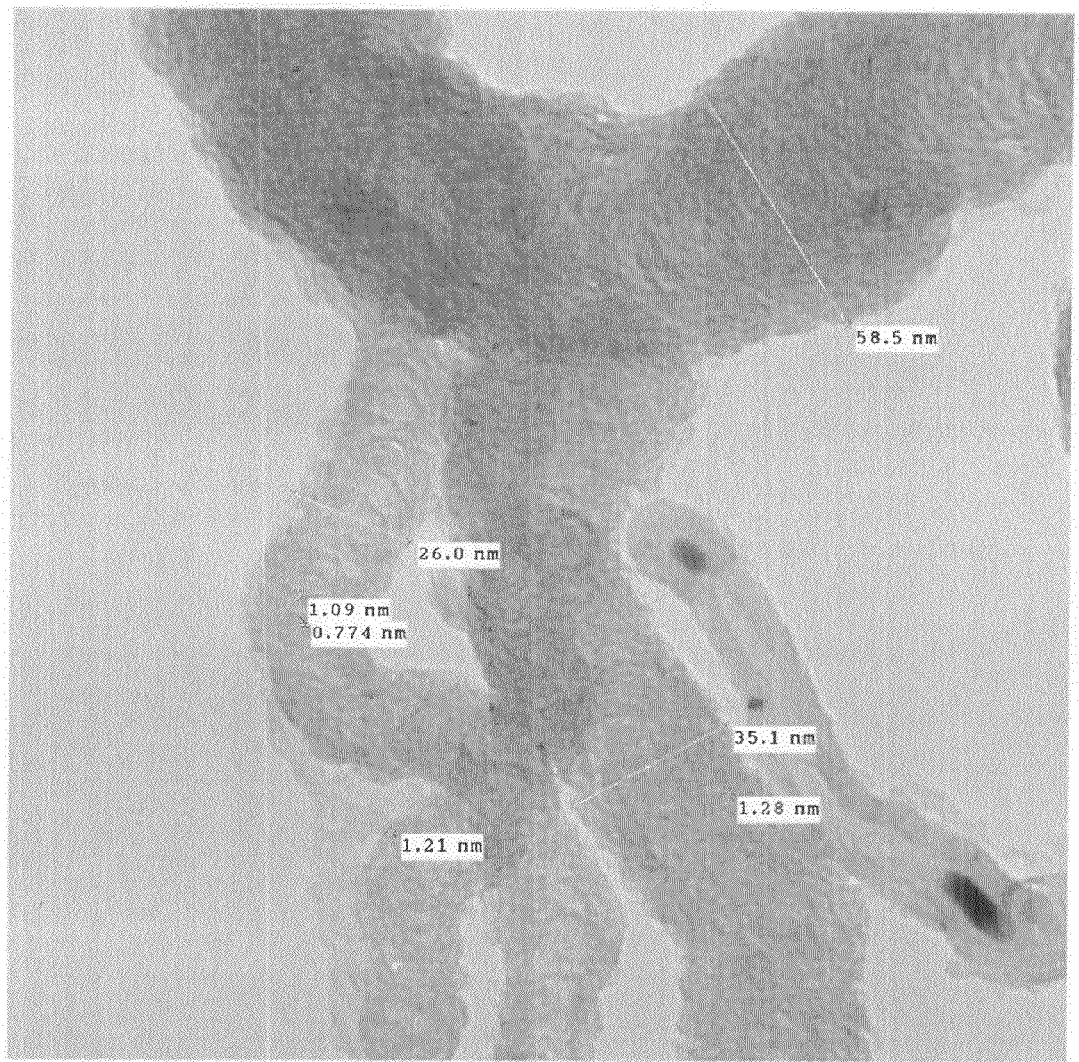
FIG. 15 shows a TEM of a branched MWCNTs.
Figure 16:
FIG. 16 shows branching in a MWCNTs.
Figure 17:
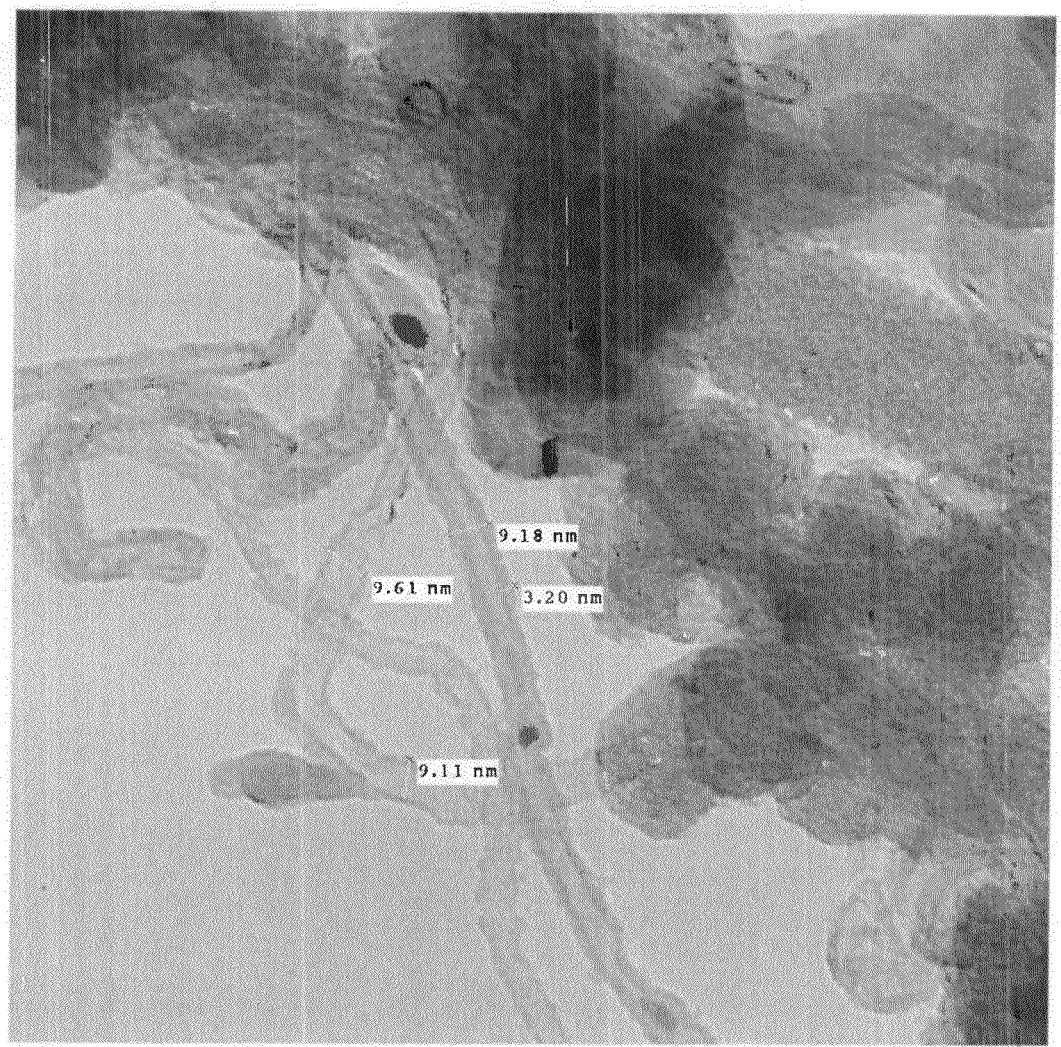
FIG. 17 shows a TEM of MWCNTs extending from a substrate surface.
Figure 18:
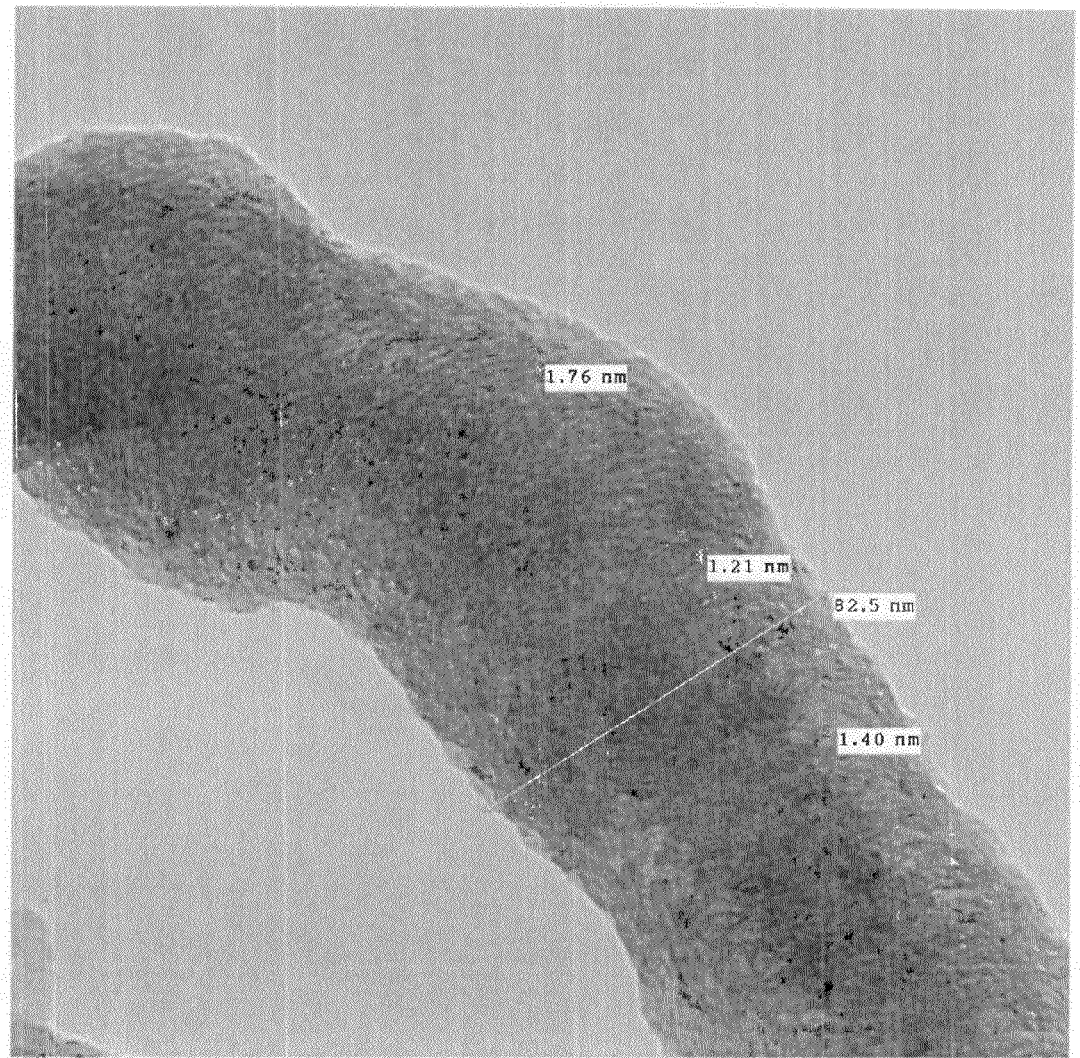
FIG. 18 shows dimensions of a portion of a MWCNT.
Figure 19:
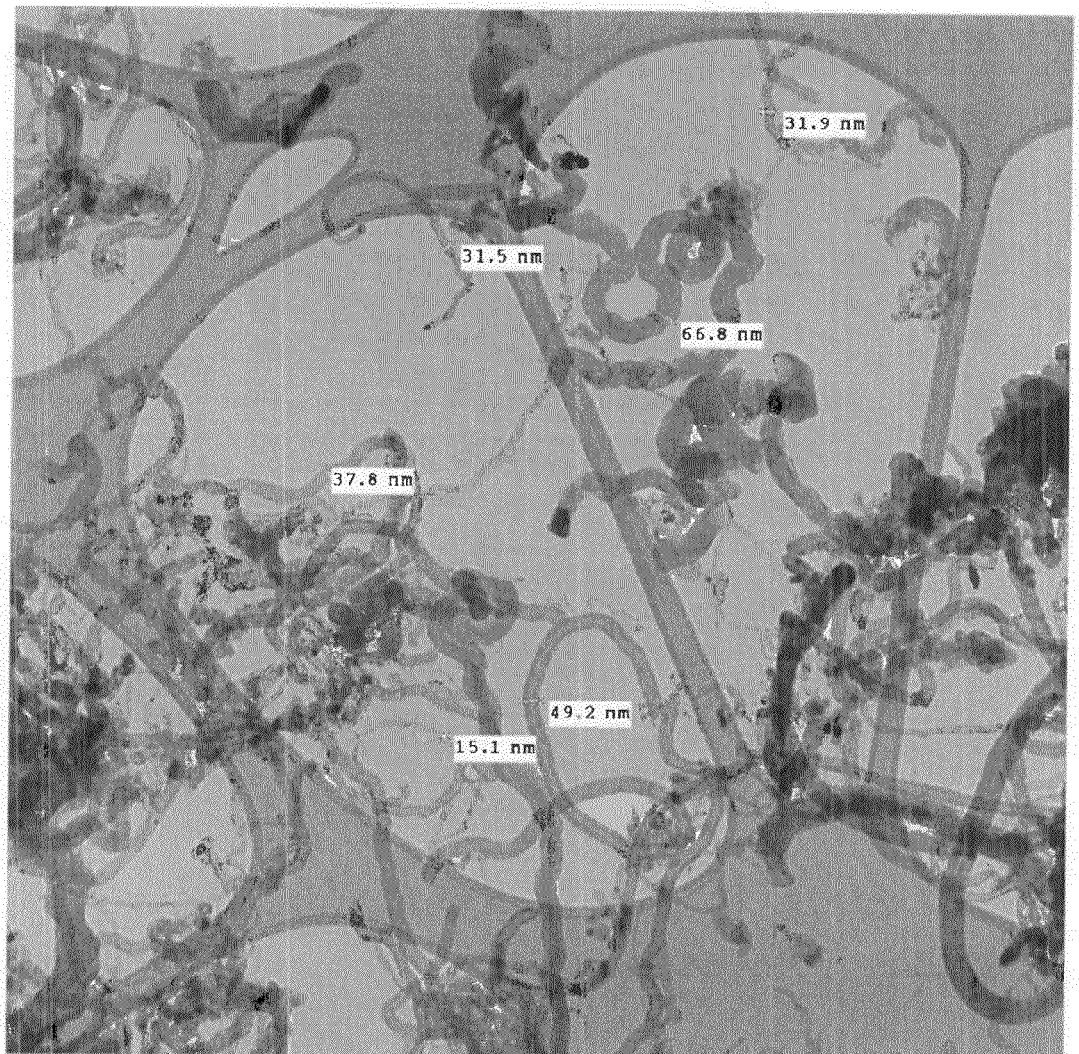
FIG. 19 shows MWCNTs obtained from an electron bean-treated fly ash.
Figure 20:
FIG. 20 shows dimensions of a MWCNT.
Figure 21:
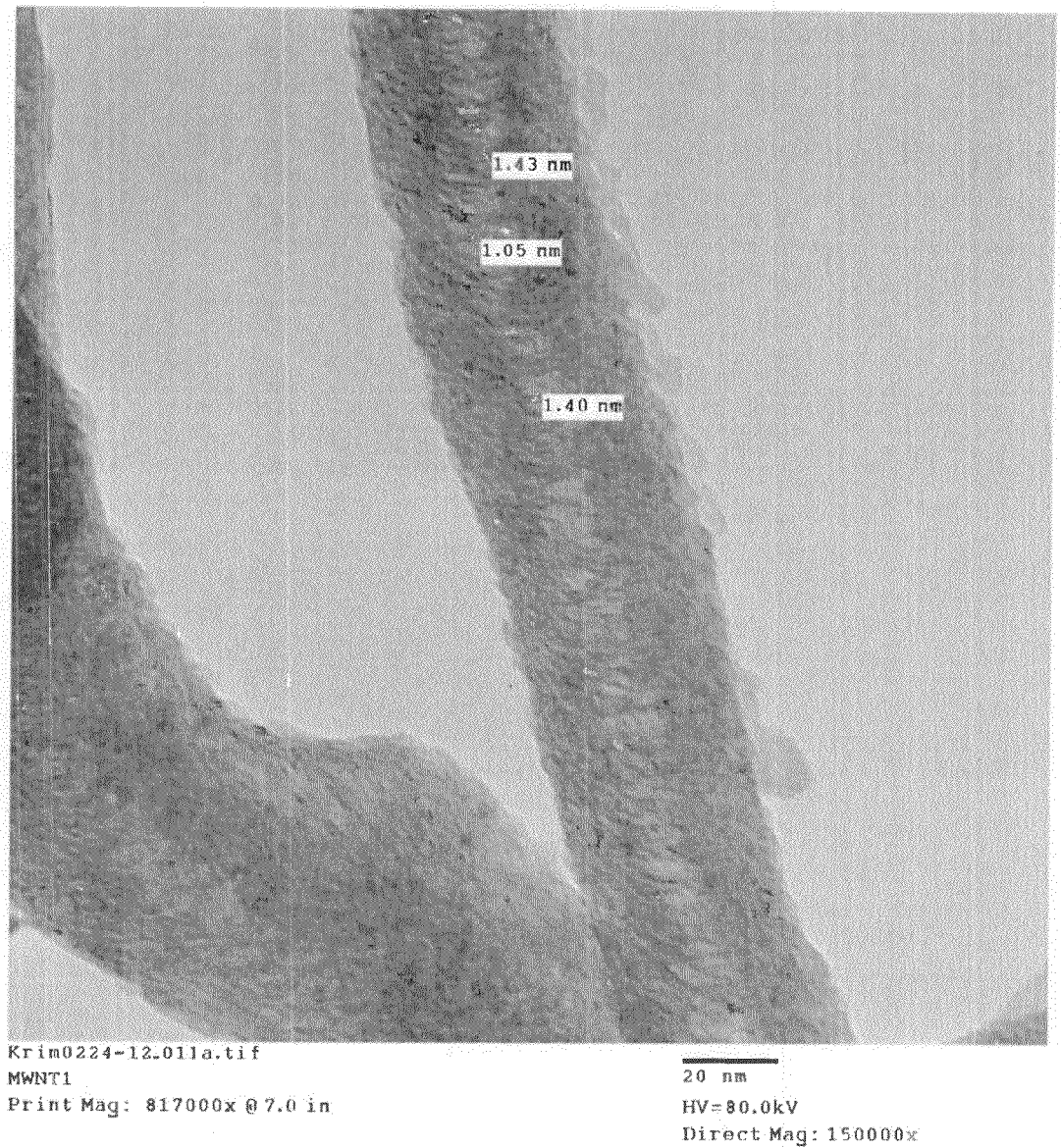
FIG. 21 shows dimensions of a MWCNT.
Figure 22:
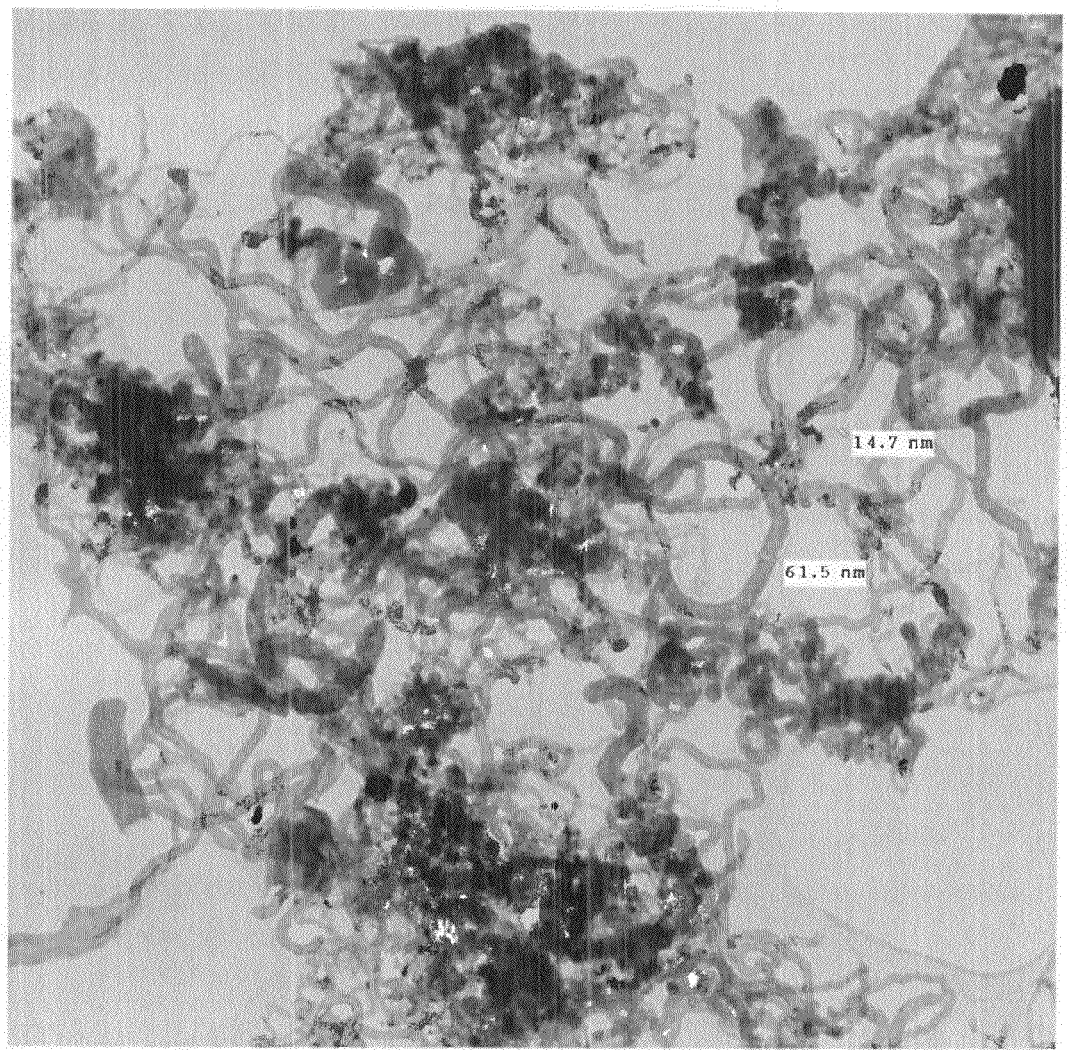
FIG. 22 shows as mixture of MWCNTs obtained from an electron beam-treated fly ash.
Figure 23:
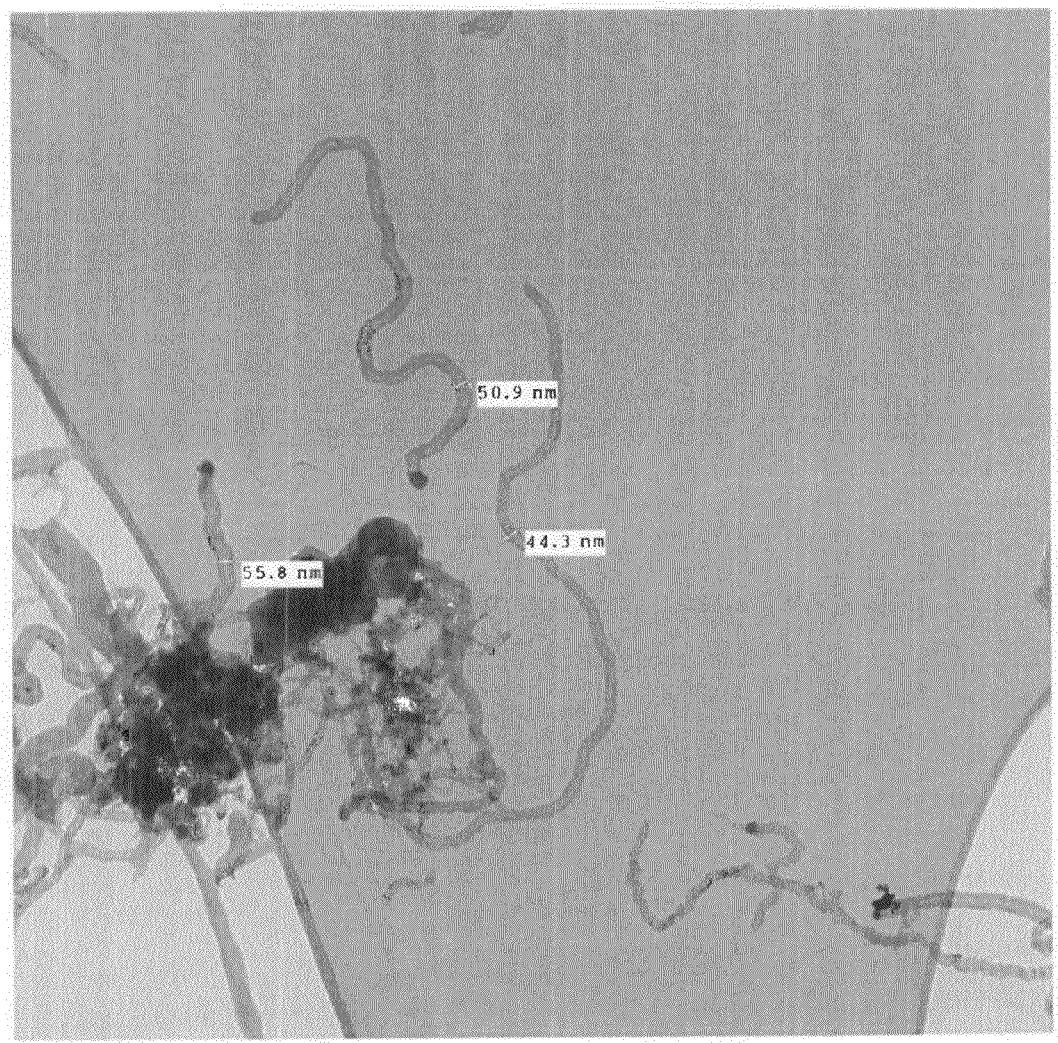
FIG. 23 shows a TEM of MWCNT collected from a process for growing nanotubes from an electron beam-treated fly ash.
Figure 24:
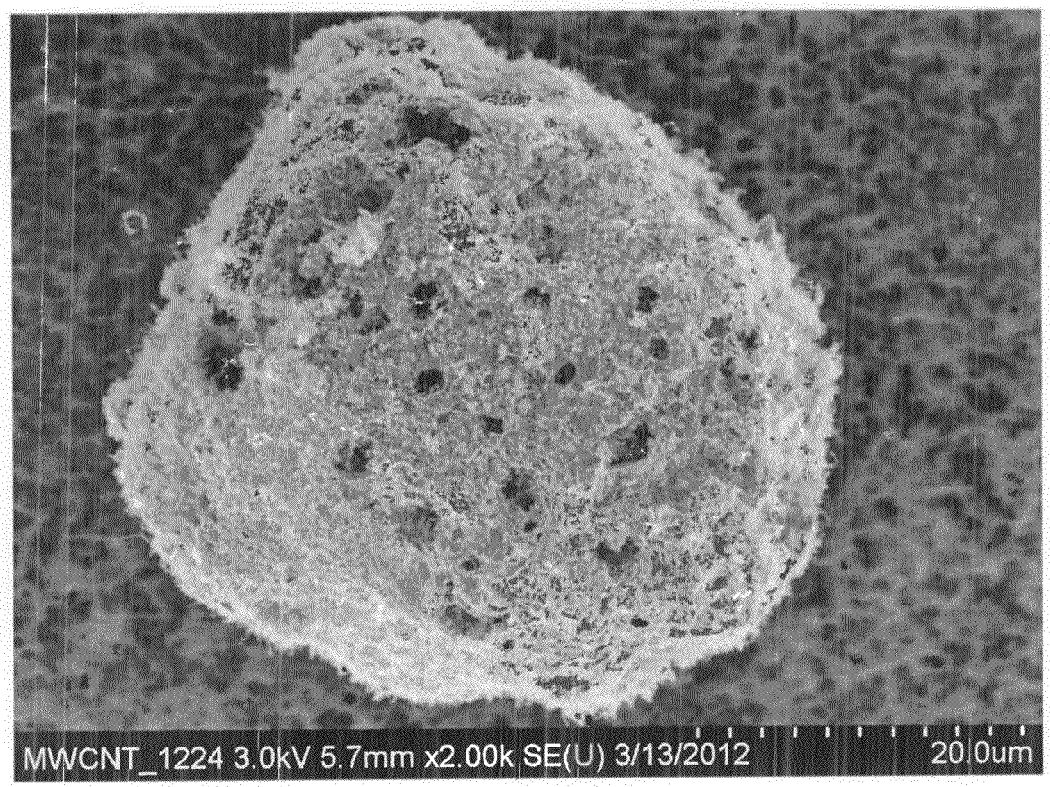
FIG. 24 shows an electron beam-treated fly ash particle having carbon nanotubes on a surface.
Figure 25:
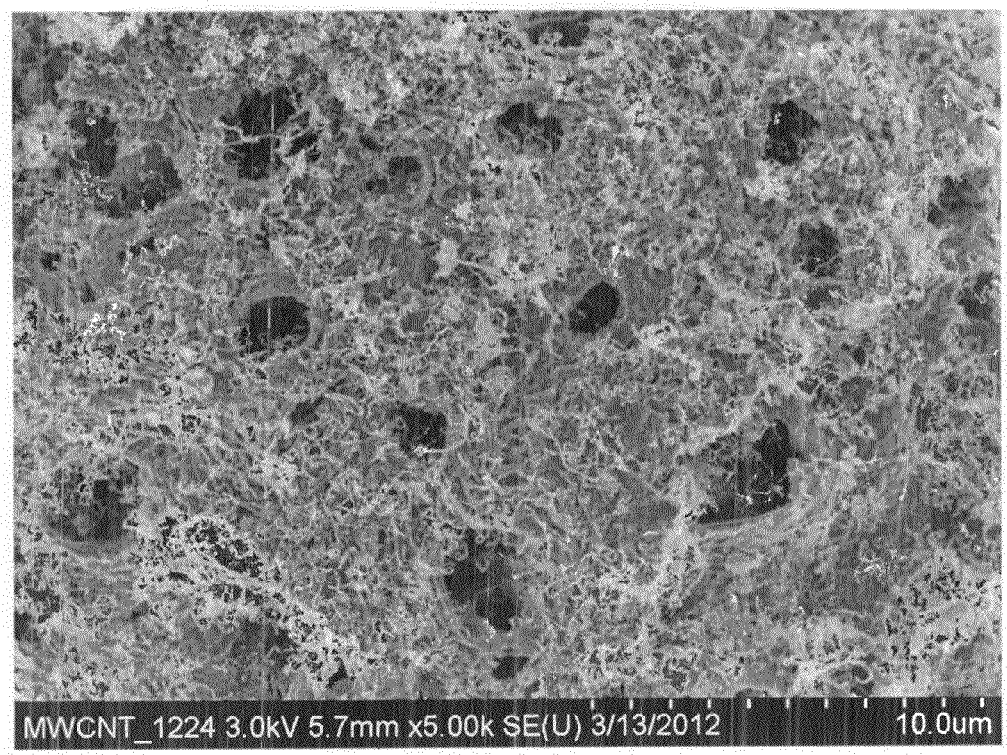
FIG. 25 shows an electron beam-treated fly ash particle having carbon nanotubes on a surface.
Figure 26:
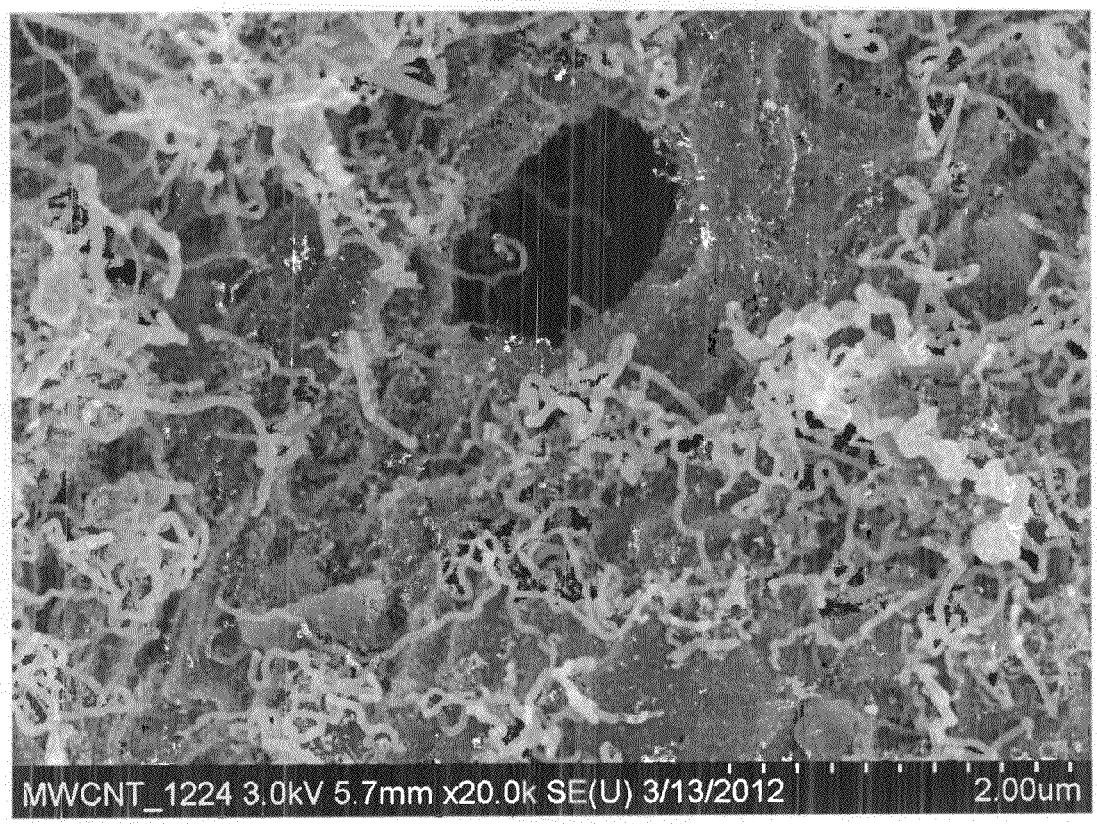
FIG. 26 shows an electron beam-treated fly ash particle had carbon nanotubes on a surface.
Figure 27:
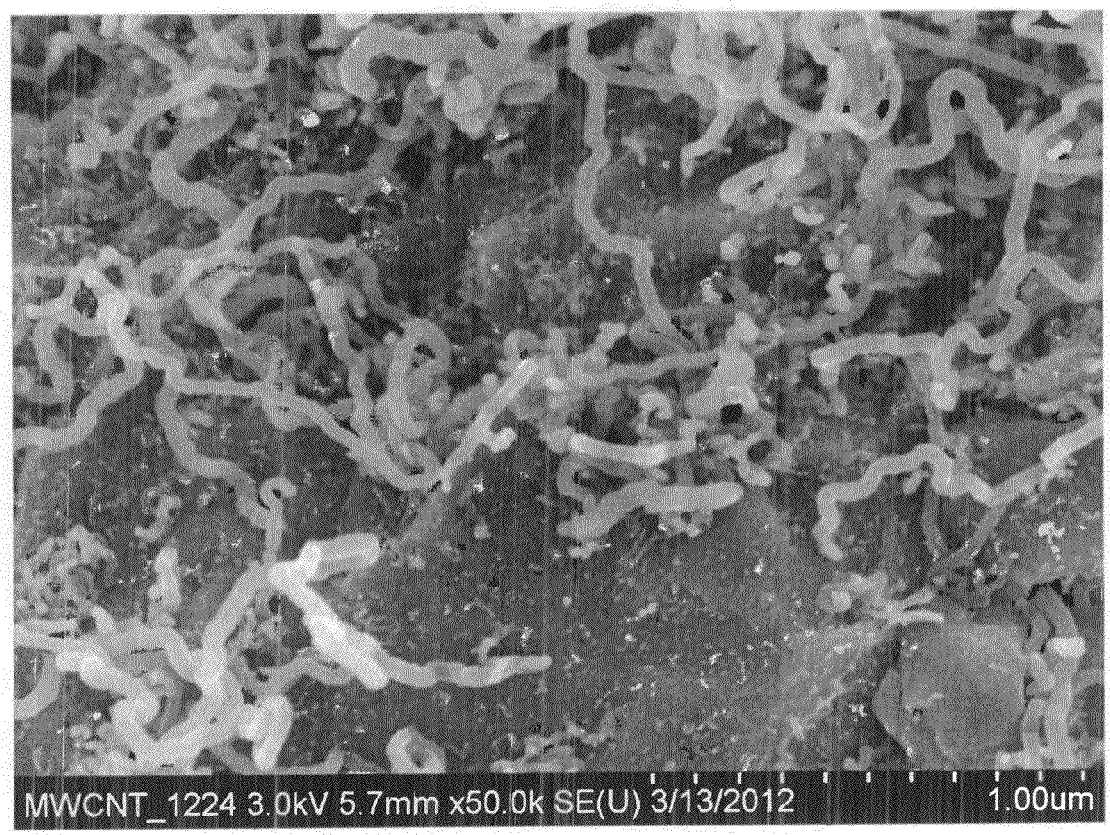
FIG. 27 shows a fly ash particle having carbon nanotubes on a surface.
Figure 28:
FIG. 28 shows a fly ash particle having carbon nanotubes on a surface.
Figure 29:
FIG. 29 shows a fly ash particle having carbon nanotubes on a surface.
Figure 30:
FIG. 30 shows a carbon nanotube with dimensions.
Figure 31:
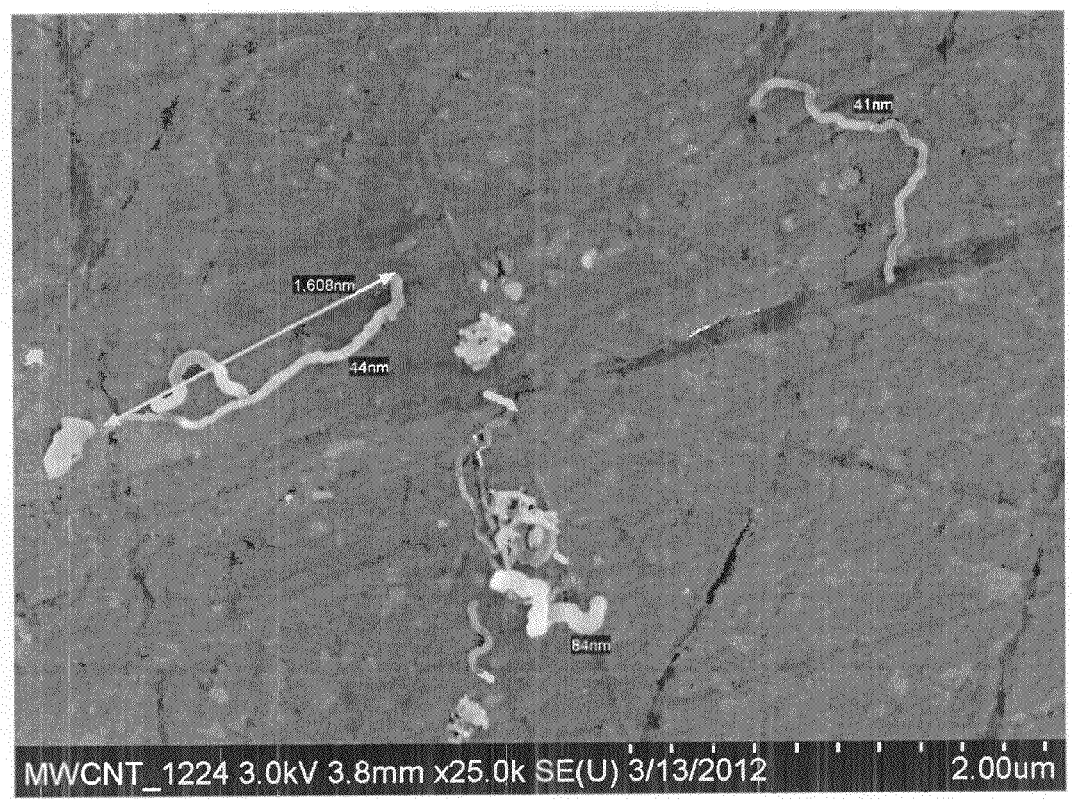
FIG. 31 shows carbon nanotubes and dimensions.
Figure 32:
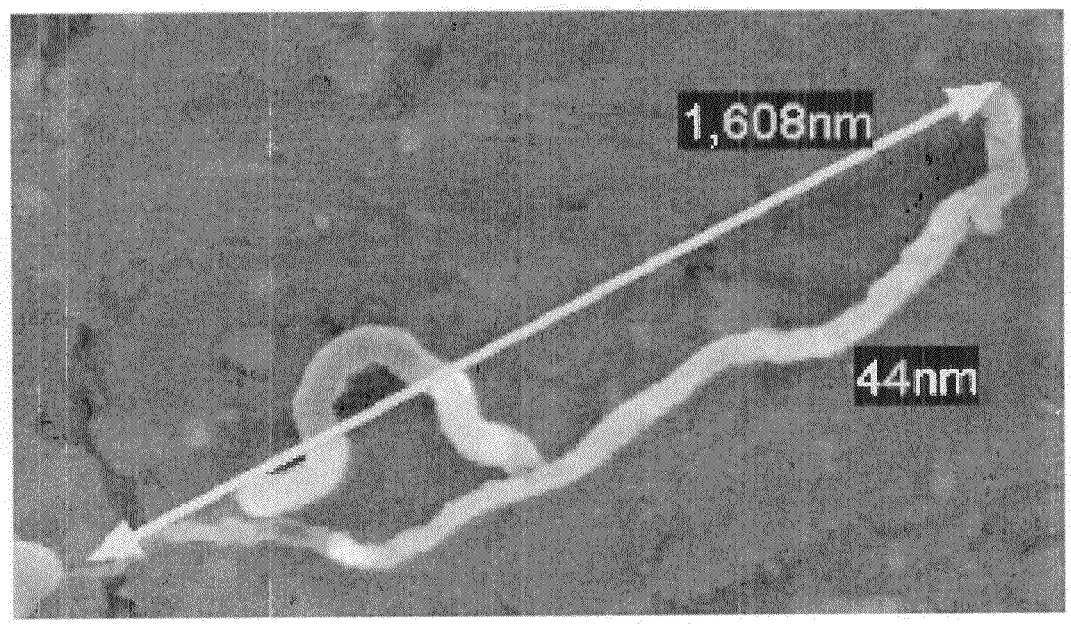
FIG. 32 shows a multi-walled carbon nanotube with dimensions.
Figure 33:
FIG. 33 shows a carbon nanotube with dimensions.
Figure 34:
FIG. 34 shows the shape of a carbon nanotube.
Figure 35:
FIG. 35 shows an end portion of a carbon nanotube.

FIG. 5 shows a carbon nanotube isolated from a process in which an electron beam-treated fly ash is contacted with a gaseous carbon source. Characteristics of the MWCNT include certain wall thickness, diameter and length dimensions. FIG. 6 shows that the surface characteristics of the carbon nanotubes may be resistant to degradation but are nevertheless subject to cracking and fissures under stress of atomic force microscopy and/or contact. FIG. 7 shows the effect of changes in size of MWCNTs on physical properties such as elastic modulus. FIG. 8 shows additional elastic modulus changes which may vary in size in the inventive MWCNTs. FIGS. 9-23 describe the MWCNTs according to transmission electron microscopy photographs. FIGS. 9-23 describe the MWCNTs obtained in an embodiment of the invention by contacting a carbon-containing gas mixture with an electron beam-treated fly ash. Under different conditions such as gas flow rate of the carbon, precursor, carbon content of the electron beam-treated fly ash, and chemical composition of the electron beam-treated fly ash MWCNTs of different dimension, physical form and branching may be obtained. FIGS. 24-35 show a fly ash particle that was first subjected to electron-beam treatment when used as a catalyst for growing multi-walled carbon nanotubes. At increasing magnification the dimensional characteristics and shape of the MWCNTs becomes apparent.

Obviously, numerous modifications and variations of the present invention are possible in light of the above teachings. It is therefore to be understood that within the scope of the appended claims, the invention may be practiced otherwise than as specifically described herein.

The invention claimed is:

1. A process for forming a multi-walled carbon nanotube, comprising:
   contacting a gaseous mixture comprising acetylene and CO with a fly ash catalyst to thereby grow multi-walled carbon nanotubes on the surface of the fly ash catalyst, wherein the temperature of the fly ash catalyst is 700-800° C. during the contacting and the fly ash catalyst is in the form of a shaped article selected from the group consisting of a pill, a briquette and a tablet;

wherein the fly ash catalyst comprises at least 85% by weight carbon and no more than 2% by weight of aluminum oxide and silicon oxide based on the total weight of the electron beam-treated fly ash catalyst, and wherein the fly ash catalyst is an electron beam-treated crude oil fly ash.

2. The process according to claim 1, wherein the electron beam-treated crude oil fly ash comprises up to 4.5% by weight of a total amount of $Fe_2O_3$ and $V_2O_5$.

3. The process according to claim 1, wherein the hydrocarbon-containing gas contains acetylene and carbon monoxide in a volume ratio of 40:60-60:40.

4. The process according to claim 1, wherein the contacting is carried out in a low pressure chemical vapor deposition apparatus at a pressure of less than 700 mm Hg.

5. The process according to claim 1, wherein the fly ash catalyst comprises $Mg_3V_2O_8$.

6. The process according to claim 1, wherein the fly ash catalyst is adhered to the surface of a substrate during the contacting.

* * * * *